(12) United States Patent
Matsumoto et al.

(10) Patent No.: US 10,754,291 B2
(45) Date of Patent: Aug. 25, 2020

(54) IMAGE FORMING APPARATUS

(71) Applicant: KYOCERA Document Solutions Inc., Osaka-shi, Osaka (JP)

(72) Inventors: Hiromu Matsumoto, Osaka (JP); Nobuhiro Fukuma, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/677,260

(22) Filed: Nov. 7, 2019

(65) Prior Publication Data

US 2020/0150580 A1 May 14, 2020

(30) Foreign Application Priority Data

Nov. 9, 2018 (JP) .................. 2018-211067

(51) Int. Cl.
*G03G 21/16* (2006.01)

(52) U.S. Cl.
CPC ..... *G03G 21/1647* (2013.01); *G03G 21/1676* (2013.01)

(58) Field of Classification Search
CPC .......... G03G 21/1647; G03G 21/1676; G03G 2221/1654; G03G 15/0863
See application file for complete search history.

(56) References Cited

U.S. PATENT DOCUMENTS

| 2005/0196180 A1* | 9/2005 | Harumoto | G03G 15/0863 399/12 |
| 2011/0274445 A1* | 11/2011 | Kabai | G03G 15/0863 399/12 |
| 2012/0027422 A1 | 2/2012 | Itabashi | |
| 2013/0028639 A1* | 1/2013 | Murata | G03G 15/0875 399/263 |
| 2013/0089343 A1* | 4/2013 | Nishimura | G03G 15/0863 399/12 |
| 2014/0037331 A1 | 2/2014 | Itabashi | |
| 2015/0104200 A1* | 4/2015 | Matsumoto | G03G 15/556 399/12 |
| 2016/0103416 A1* | 4/2016 | Eto | G03G 21/1633 399/119 |
| 2017/0235273 A1* | 8/2017 | Mimura | G03G 21/1676 399/12 |
| 2017/0315470 A1* | 11/2017 | Mochizuki | G03G 15/0856 |
| 2017/0315502 A1* | 11/2017 | Mochizuki | G03G 15/0891 |
| 2018/0203377 A1* | 7/2018 | Wakamatsu | G03G 15/0863 |
| 2018/0210370 A1* | 7/2018 | Wakimoto | G03G 21/1633 |

FOREIGN PATENT DOCUMENTS

| JP | 2009181023 A | 8/2009 |
| JP | 201232694 A | 2/2012 |

* cited by examiner

*Primary Examiner* — Francis C Gray
(74) *Attorney, Agent, or Firm* — Alleman Hall Creasman & Tuttle LLP

(57) ABSTRACT

An image forming apparatus includes a toner container, and a lock drive portion. The toner container is attached to an attachment position set in an apparatus main body. The lock drive portion acquires a identification information from a storage portion, and upon determining, based on the identification information, that the toner container has an attachment compatibility, places a lock member at a lock position, and upon determining that the toner container does not have the attachment compatibility, places the lock member at a unlock position.

11 Claims, 21 Drawing Sheets

IMAGE FORMING APPARATUS

INCORPORATION BY REFERENCE

This application is based upon and claims the benefit of priority from the corresponding Japanese Patent Application No. 2018-211067 filed on Nov. 9, 2018, the entire contents of which are incorporated herein by reference.

BACKGROUND

The present disclosure relates to an image forming apparatus to which a toner container having an attachment compatibility is attached in a detachable manner.

There is known an image forming apparatus for forming an image on a sheet using developer including toner. This type of image forming apparatus is provided with a toner container(s) that supplies the toner to a developing device within the image forming apparatus. The toner container(s) is attached to an apparatus main body of the image forming apparatus in a detachable manner. When the toner in the toner container is consumed and the toner container becomes empty, the toner container is removed from the image forming apparatus and replaced with a new toner container filled with unused toner.

When the toner container is replaced, a cover covering an opening of the apparatus main body formed in a top surface or a side surface thereof is opened, and the toner container is taken out from the inside of the apparatus main body through the opening, and a new toner container is inserted in the apparatus main body through the opening.

In addition, there is known a structure (incompatibility structure) adopted in an image forming apparatus, where only a toner container having an attachment compatibility can be attached to an apparatus main body, and a toner container that is incompatible with the apparatus main body cannot be attached to the apparatus main body. This prevents an erroneous attachment of a toner container to the apparatus main body, thereby preventing an inappropriate toner from being supplied to a developing device. The incompatibility structure is realized by a container-side compatible key and an apparatus-side compatible key, wherein the container-side compatible key is provided on the toner container, and the apparatus-side compatible key is provided in the apparatus main body. According to the incompatibility structure, only a toner container corresponding to a container attachment portion can be attached to the container attachment portion, and the toner container cannot be attached to another container attachment portion because in that case, the compatible keys interrupt each other.

In addition, there is known a toner container including a memory (storage portion) storing information such as the capacity of the toner container. When a toner container is attached to a container attachment portion of an image forming apparatus, the memory and the container attachment portion are electrically connected with each other. This enables the image forming apparatus to detect an attachment of the toner container to an attachment position, and acquire, from the memory of the toner container, identification information including individual information such as a color of toner contained in the toner container.

SUMMARY

An image forming apparatus according to an aspect of the present disclosure includes a toner container, a storage portion, a support member, a lock member, a moving mechanism, and a lock drive portion. The toner container is attached to an attachment position set in an apparatus main body. The storage portion is provided in the toner container and stores identification information of the toner container. The support member supports the toner container so that the toner container can be moved between the attachment position and a detachment position that is separated from the attachment position toward a predetermined first surface of the apparatus main body. The lock member is provided on the support member in such a way as to be movable in a first direction that extends along the first surface. The lock member is displaced between a lock position and an unlock position, wherein when the lock member is located at the lock position, the lock member is engaged with the toner container so that the toner container is locked to the attachment position, and when the lock member is located at the unlock position, the toner container is unlocked from the attachment position. The moving mechanism moves the toner container from the attachment position to the detachment position in conjunction with a displacement of the lock member from the lock position to the unlock position. The lock drive portion acquires the identification information from the storage portion, and upon determining, based on the identification information, that the toner container has an attachment compatibility, places the lock member at the lock position, and upon determining that the toner container does not have the attachment compatibility, places the lock member at the unlock position.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the drawings. It should be noted that the following embodiment is an example of a specific embodiment of the present disclosure and should not limit the technical scope of the present disclosure. It is noted that, for the sake of explanation, a vertical direction in a state where an image forming apparatus 10 is usably installed (the state shown in FIG. 1), is defined as an up-down direction D1. In addition, a front-rear direction D2 and a left-right direction D3 are defined in the state where the image forming apparatus 10 is usably installed.

The image forming apparatus 10 according to the present embodiment has at least a print function. The image forming apparatus 10 is, for example, a tandem-type color printer.

Figure 1:
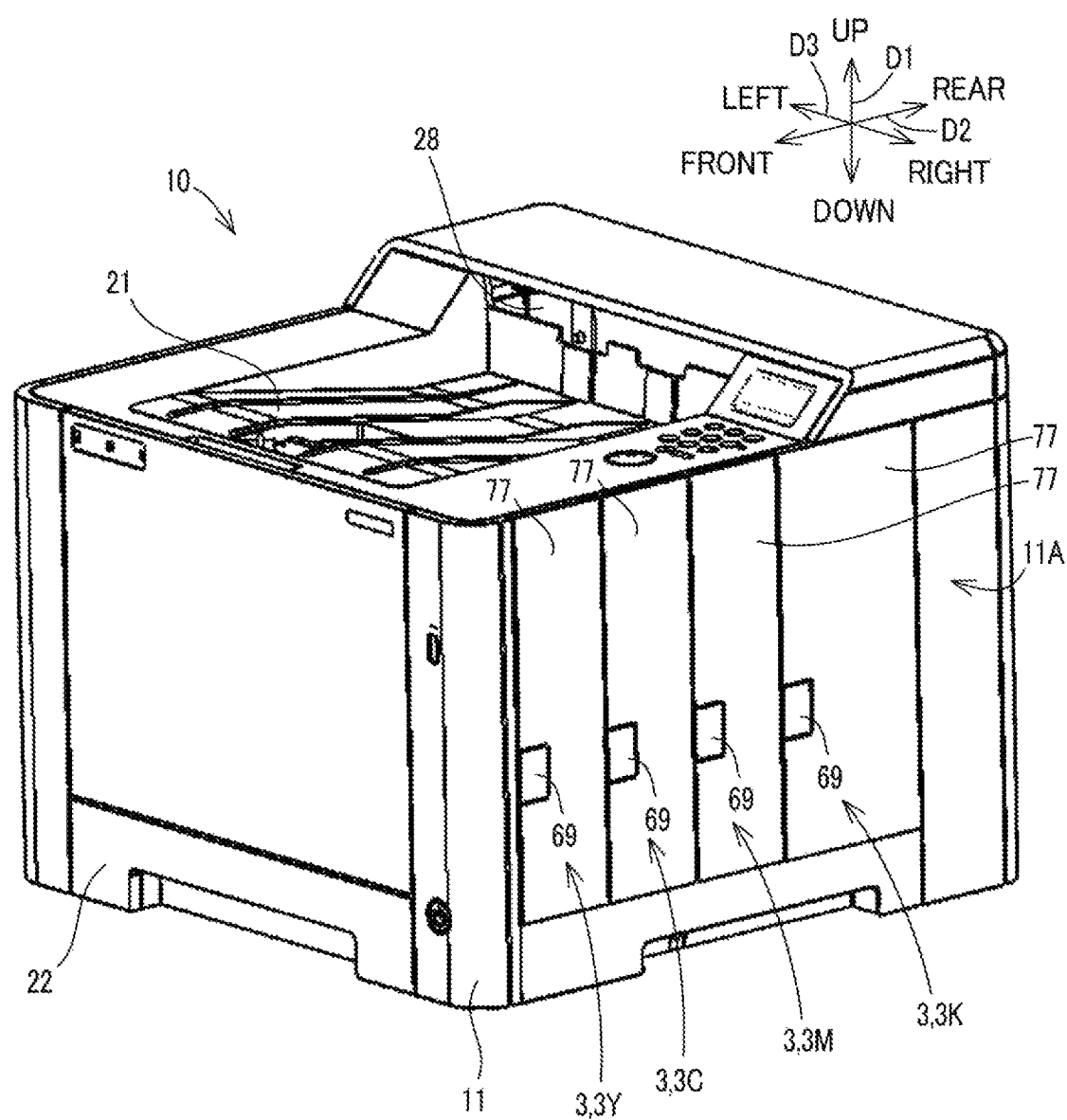
FIG. 1 is a perspective diagram showing a configuration of an image forming apparatus according to an embodiment of the present disclosure.
Figure 2:
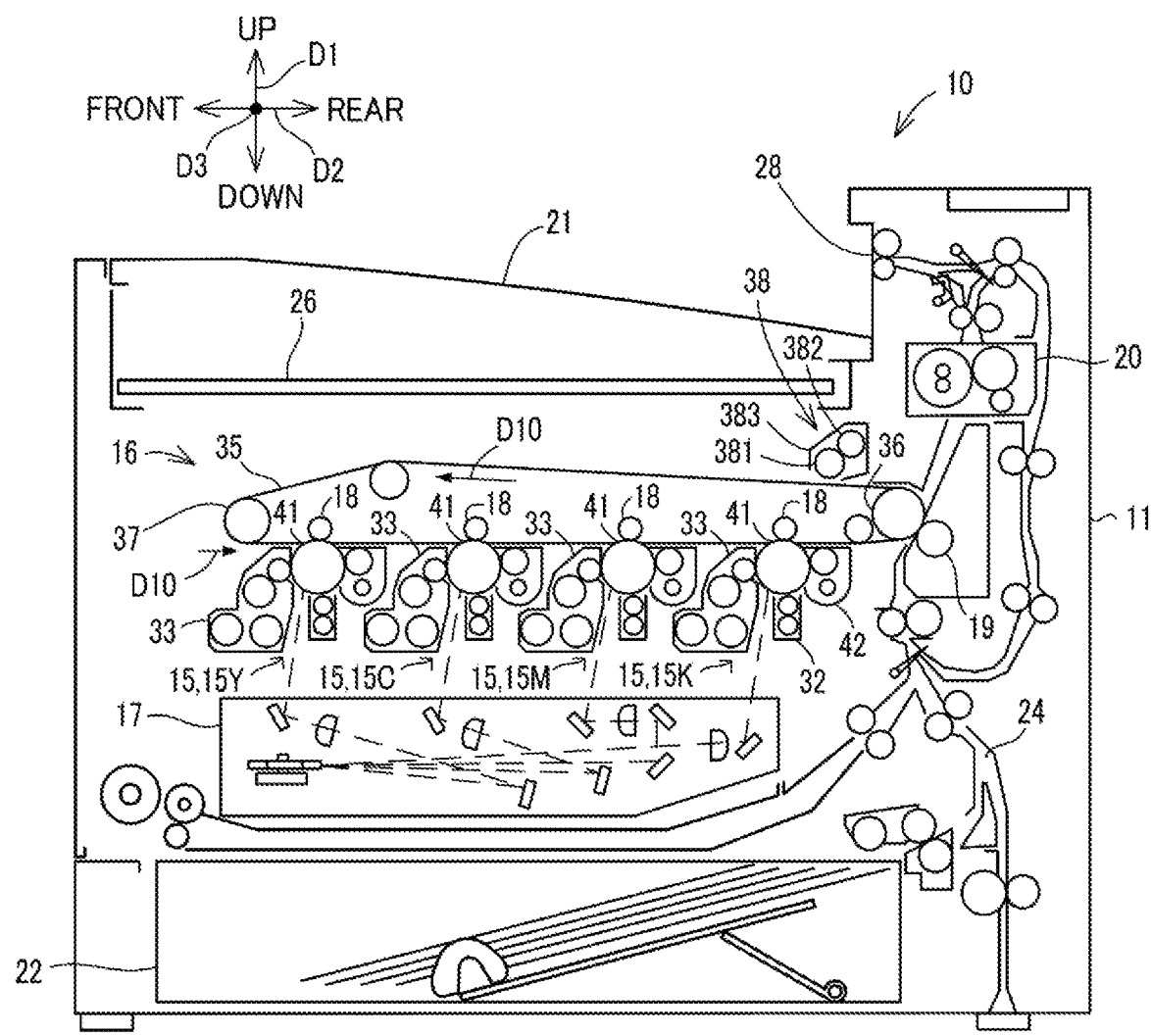
FIG. 2 is a cross-sectional diagram showing an internal configuration of the image forming apparatus.

As shown in FIG. 1 and FIG. 2, the image forming apparatus 10 includes a housing 11 (an example of an apparatus main body of the present disclosure). The housing 11 has an approximately parallelepiped shape as a whole. Some of the components constituting the image forming apparatus 10 are stored in the housing 11.

As shown in FIG. 2, the image forming apparatus 10 includes a plurality of image forming units 15 (15Y, 15C, 15M, and 15K), an intermediate transfer unit 16, a laser scanning unit 17, a primary transfer roller 18, a secondary transfer roller 19, a fixing device 20, a sheet tray 21, the sheet feed cassette 22, a conveyance path 24, and a control portion 26 configured to control the components of the image forming apparatus 10. In addition, as shown in FIG. 1, the image forming apparatus 10 includes a plurality of toner containers 3 (an example of a toner container of the present disclosure) attached to the inside of the housing 11 in a detachable manner.

The image forming apparatus 10 includes four image forming units 15. The image forming units 15 form toner images by an electrophotographic method. Each of the image forming units 15 includes a photoconductor drum 41, a drum cleaning device 42, a charging device 32, and a developing device 33. It is noted that in FIG. 2, some reference signs "32" and "42" are omitted for want of space.

As shown in FIG. 2, the image forming units 15 are arranged in alignment along the front-rear direction D2 in the housing 11, and form a color image based on what is called a tandem system. Specifically, the image forming unit 15Y is configured to form a toner image of yellow, and the image forming units 15C, 15M and 15K form toner images of cyan, magenta and black, respectively. The image forming units 15Y for yellow, 15C for cyan, 15M for magenta, and 15K for black are arranged in alignment in the stated order from front to rear along the running direction (the direction indicated by the arrow D10) of a transfer belt 35 of the intermediate transfer unit 16.

The photoconductor drum 41 has a cylindrical shape and carries a toner image developed by the developing device 33. The photoconductor drum 41 is rotatably supported by the housing 11 or the like.

In each of the image forming units 15, the charging device 32 uniformly charges the photoconductor drum 41 to a certain potential. Subsequently, the laser scanning unit 17 irradiates a laser beam on the surface of the photoconductor drum 41 based on the image data. In this processing, electrostatic latent images are formed on the respective surfaces of the photoconductor drums 41. The electrostatic latent images are developed by the developing devices 33 as the toner images. The toner images of the respective colors on the surfaces of the photoconductor drums 41 are transferred to the transfer belt 35 by the primary transfer rollers 18 such that the toner images are overlaid with each other in sequence. Next, the color image on the transfer belt 35 is transferred by the secondary transfer roller 19 to a print sheet. The color image transferred to the print sheet is fixed to the print sheet by the fixing device 20, and thereafter, the print sheet is discharged from a sheet discharge port 28 to the sheet tray 21.

The drum cleaning device 42 is configured to remove, by a cleaning blade, toner that has remained on the photoconductor drum 41 after the primary transfer. The drum cleaning device 42 is provided on the rear side of each photoconductor drum 41. The tip of the cleaning blade is disposed so as to be in contact with or close to the surface of the photoconductor drum 41. When the photoconductor drum 41 is rotated, the cleaning blade removes toner that has remained on the surface of the photoconductor drum 41 after the transfer. Hereinafter the removed toner is referred to as "waste toner" since it is to be discarded from the apparatus. A spiral member is a toner conveyance member having a spiral blade around a rotation shaft. The spiral member is driven to rotate so as to convey the waste toner removed by the cleaning blade. The waste toner is conveyed toward one side (in the present embodiment, the right side) in the axial direction (longitudinal direction) of the photoconductor drum 41.

As shown in FIG. 1, a plurality of toner containers 3 (3Y, 3C, 3M and 3K) are attached to the image forming apparatus 10. The plurality of toner containers 3 are attached to a right side surface 11A (an example of a first surface of the present disclosure) of the housing 11 of the image forming apparatus 10. In the present embodiment, the four toner containers 3 are attached to the right side surface 11A in a state of being aligned along the front-rear direction D2, wherein a toner container 3Y is disposed at the front-most position, and a toner container 3K for black is disposed at the rear-most position.

Figure 3:
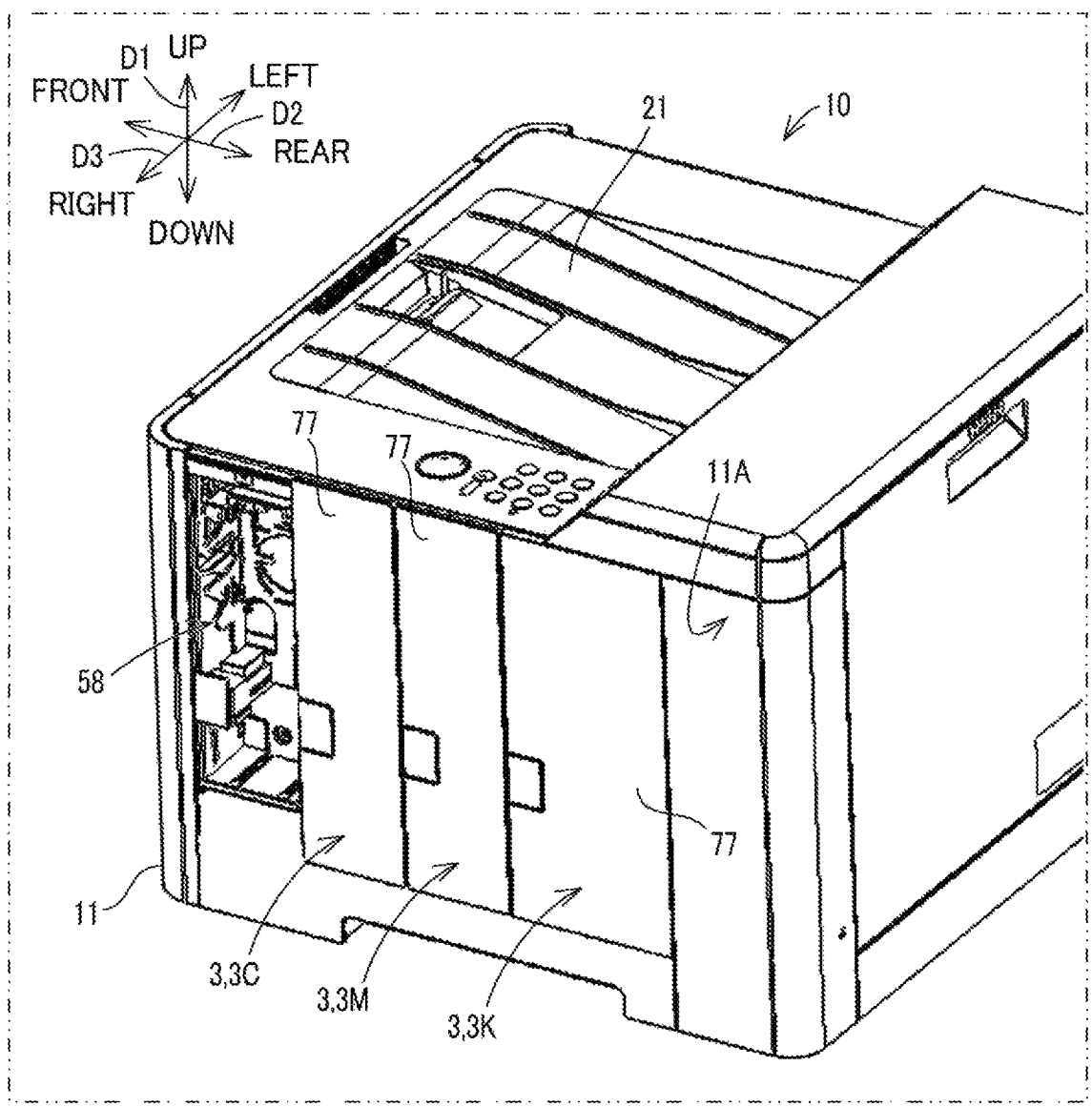
FIG. 3 is a diagram of the image forming apparatus viewed from the right side.

FIG. 3 is a perspective diagram of the image forming apparatus 10 viewed from the right side, where the toner container 3Y at the front-most position has been detached therefrom. As shown in FIG. 3, attachment portions 58 for supporting the toner containers 3 that are attached thereto in a detachable manner, are provided inside the right side surface 11A of the housing 11. It is noted that although FIG. 3 shows only an attachment portion 58 to which the toner container 3Y is attached, a plurality of attachment portions 58 are provided in the housing 11 in correspondence with the plurality of toner containers 3.

Each of the toner containers 3 includes an upper storage portion 71 (a first toner storage portion) and a lower storage portion 72 (a second toner storage portion). The upper storage portion 71 includes, inside thereof, a storage space storing unused toner for supply. The lower storage portion 72 includes, inside thereof, a storage space for storing the waste toner discharged from the drum cleaning device 42. In the state where the toner containers 3 are attached to the attachment portions 58, the unused toner is supplied to the inside of the developing devices 33 from the upper storage portions 71 of the toner containers 3. In addition, the waste toner discharged from the drum cleaning devices 42 passes through discharge guide portions (not shown), and is guided to and stored in the lower storage portions 72 of the toner containers 3.

As shown in FIG. 3, the four toner containers 3 are attached to the right side surface 11A of the housing 11 on the right side of the image forming units 15. The toner containers 3 are arranged in alignment along the front-rear direction D2 at the right side surface 11A of the housing 11. The toner containers 3 are described in detail below.

As shown in FIG. 2, the intermediate transfer unit 16 is provided above the four image forming units 15. More specifically, the intermediate transfer unit 16 is provided above the photoconductor drums 41. The intermediate transfer unit 16 includes the transfer belt 35, a driving roller 36, a driven roller 37, and a belt cleaning device 38. It is noted that the primary transfer roller 18 is supported by a frame (not shown) of the intermediate transfer unit 16.

The transfer belt 35 is an annular belt member, and is suspended between the driving roller 36 and the driven roller 37 to extend in the front-rear direction D2. A plurality of drum units 31 are arranged in alignment in the front-rear direction D2 along the transfer belt 35. The transfer belt 35 holds, on its surface, toner images primarily transferred from the photoconductor drums 41. When the transfer belt 35 is driven to move in a direction indicated by the arrow D10, the toner images of respective colors carried by the photoconductor drums 41 are transferred in sequence onto the transfer belt 35 such that the toner images are overlaid with each other.

The belt cleaning device 38 is provided in the vicinity of the fixing device 20. Specifically, the belt cleaning device 38 is provided above the transfer belt 35 on the rear side of the housing 11. Below the belt cleaning device 38, the image forming unit 15K for black is disposed. That is, the belt cleaning device 38 is located closest to the image forming unit 15K for black among the plurality of image forming units 15.

The belt cleaning device 38 is configured to remove used toner that has remained on the surface of the transfer belt 35, and convey the removed used toner (hereinafter referred to as "waste toner") toward the lower storage portion 72 of the toner container 3K via a toner discharge path (not shown) of the drum cleaning device 42 for black. The belt cleaning device 38 includes a cleaning roller 381 that is elongated in the left-right direction D3, a spiral member 382 as a conveyance member for conveying the waste toner, and a housing 383 for storing these components (see FIG. 2). The cleaning roller 381 is configured to remove the used toner from the surface of the transfer belt 35 by rotating while in contact with the surface of the transfer belt 35. The used toner (waste toner) thus removed is conveyed in a certain direction by the spiral member 382 that is rotating. Specifically, the waste toner is conveyed toward one side (in the present embodiment, the right side) of the width direction (that matches the left-right direction D3) of the transfer belt 35.

In the belt cleaning device 38, the waste toner that has been conveyed to the right end of the housing 383 by the spiral member 382 is conveyed along the toner discharge path to be guided to and stored in the lower storage portion 72 of the toner container 3K.

The control portion 26 is configured to control the image forming apparatus 10 comprehensively, and controls, for example: the image formation in the image forming apparatus 10; the authentication of the compatibility of the toner containers 3; and the attachment and detachment of the toner containers 3.

Figure 4:
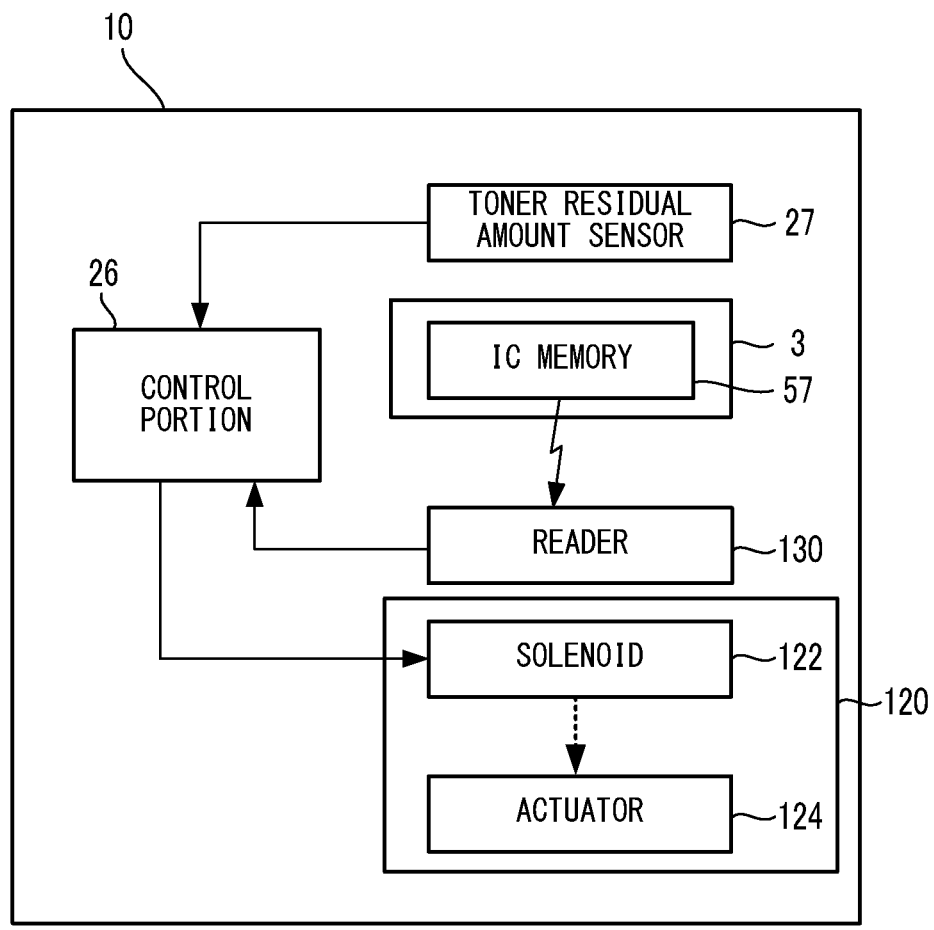
FIG. 4 is a block diagram showing components used to drive and control a lock drive portion.

As shown in FIG. 4, the image forming apparatus 10 further includes toner residual amount sensors 27, readers 130, and actuator portions 120. The control portion 26 is electrically connected to the toner residual amount sensors 27, the readers 130, and solenoids 122 of the actuator portions 120.

The control portion 26 includes a CPU, a ROM, a RAM, and a flash memory, and executes various processes such as an image forming process executed in the image forming apparatus 10. In the present embodiment, the control portion 26 executes a locking process for locking the toner containers 3 to the attachment portions 58, and an unlocking process shown in FIG. 18 to FIG. 22.

The toner residual amount sensors 27 detects residual amounts of toner in the toner containers 3 attached to the attachment portions 58. A plurality of toner residual amount sensors 27 are provided in correspondence with the plurality of attachment portions 58. The toner residual amount sensors 27 are, for example, weight sensors for detecting the weights of the toner containers 3, or light sensors for detecting the amounts of toner in the upper storage portions 71 of the toner containers 3. The toner residual amount sensors 27 are connected to the control portion 26, and the control portion 26 determines whether the upper storage portions 71 are empty of the toner or nearly empty based on detection signals output from the toner residual amount sensors 27. In the present embodiment, upon determining that an upper storage portion 71 of a toner container 3 is empty of the toner, the control portion 26, in order to displace the toner container 3 to a detachment position described below, changes the attitude of an actuator 124 of the actuator portion 120 from an engagement attitude to a retreat attitude that are described below, by energizing and driving the solenoid 122. It is noted that instead of using the toner residual amount sensors 27, the control portion 26, for example, may count the number of dots of the toner used by the image forming units 15 based on the image data used in the image forming process, and may obtain the toner consumption amount and the toner residual amount based on the cumulative value of the counting.

The readers 130 perform communication with contactless IC memories 57 (an example of a storage portion of the present disclosure) which are included in the toner containers 3, and read information therefrom. A plurality of readers 130 are provided in correspondence with the plurality of attachment portions 58. The readers 130 are disposed so as to face the IC memories 57 when the toner containers 3 are attached to the attachment positions described below. When a toner container 3 is attached, a corresponding reader 130 emits a predetermined electric wave toward the IC memory 57 to start reading and obtaining data from the IC memory 57. When the toner container 3 is attached to the attachment position that is set in the attachment portion 58, the reader 130 obtains data from the IC memory 57 in a reliable manner. The obtained data is sent to the control portion 26 to be used in various processes by the control portion 26. The IC memory 57 stores identification information of the toner container 3, a toner capacity, a date of production, and a serial number of the toner container 3. The identification information is used to determine whether or not the toner container 3 is adaptable with the image forming apparatus 10, and includes, for example, the color of toner contained in the toner container 3, the type of toner, and environmental information for use (e.g., a temperature range). It is noted that a contact-type memory may be used instead of the contactless IC memory 57 so that a data transfer is performed when the contact-type memory is in contact with a connection terminal.

The control portion 26 determines whether or not the toner container 3 is adaptable based on the identification information sent from the reader 130. For example, identification information of toner containers 3 which are adaptable with the image forming apparatus 10 are preliminarily registered in an internal memory of the control portion 26, and the control portion 26 compares identification information sent from the reader 130 with the registered identification information: if they match, the control portion 26 determines that the toner container 3 is adaptable; and if they do not match, the control portion 26 determines that the toner container 3 is unadaptable. In the present embodiment, upon determining that the toner container 3 is adaptable, the control portion 26 holds the toner container 3 at the attachment position. On the other hand, upon determining that the toner container 3 is unadaptable, the control portion 26 displaces the toner container 3 to the detachment position by driving and controlling the actuator portion 120. That is, in order to displace the toner container 3 to the detachment position described below, the control portion 26 energizes the solenoid 122 to change the attitude of the actuator 124 of the actuator portion 120 from the engagement attitude to the retreat attitude that are described below.

Meanwhile, in conventional image forming apparatuses, when a toner container 3 is replaced with another one, a cover attached to a top surface or a side surface of the apparatus is opened. The cover is supported by the apparatus main body in such a way as to pivot around a hinge or the like. Therefore, like a door, the cover needs to be pivoted around the hinge. In this case, it is necessary to secure a large space at the top surface or the side surface of the apparatus main body so that at least the cover can pivot when the toner container 3 is replaced. This poses a problem of restricting the installment space of the image forming apparatus.

On the other hand, according to the image forming apparatus 10 of the present embodiment, the toner container 3 is provided with an exterior panel 77 (see FIG. 5), and the attachment portion 58 is configured as described below. This makes it possible to reduce the space necessary to replace the toner container 3 compared with the conventional apparatuses, thereby enhancing the flexibility of installing the image forming apparatus 10.

The following describes the configuration of the toner container 3Y as a representative of the four toner containers 3. It is noted that the toner containers 3C and 3M have the same configuration as the toner container 3Y, and the toner container 3K has the same configuration as the toner container 3Y except that it has a larger capacity, and thus description of the toner containers 3C, 3M, and 3K is omitted.

Figure 5:
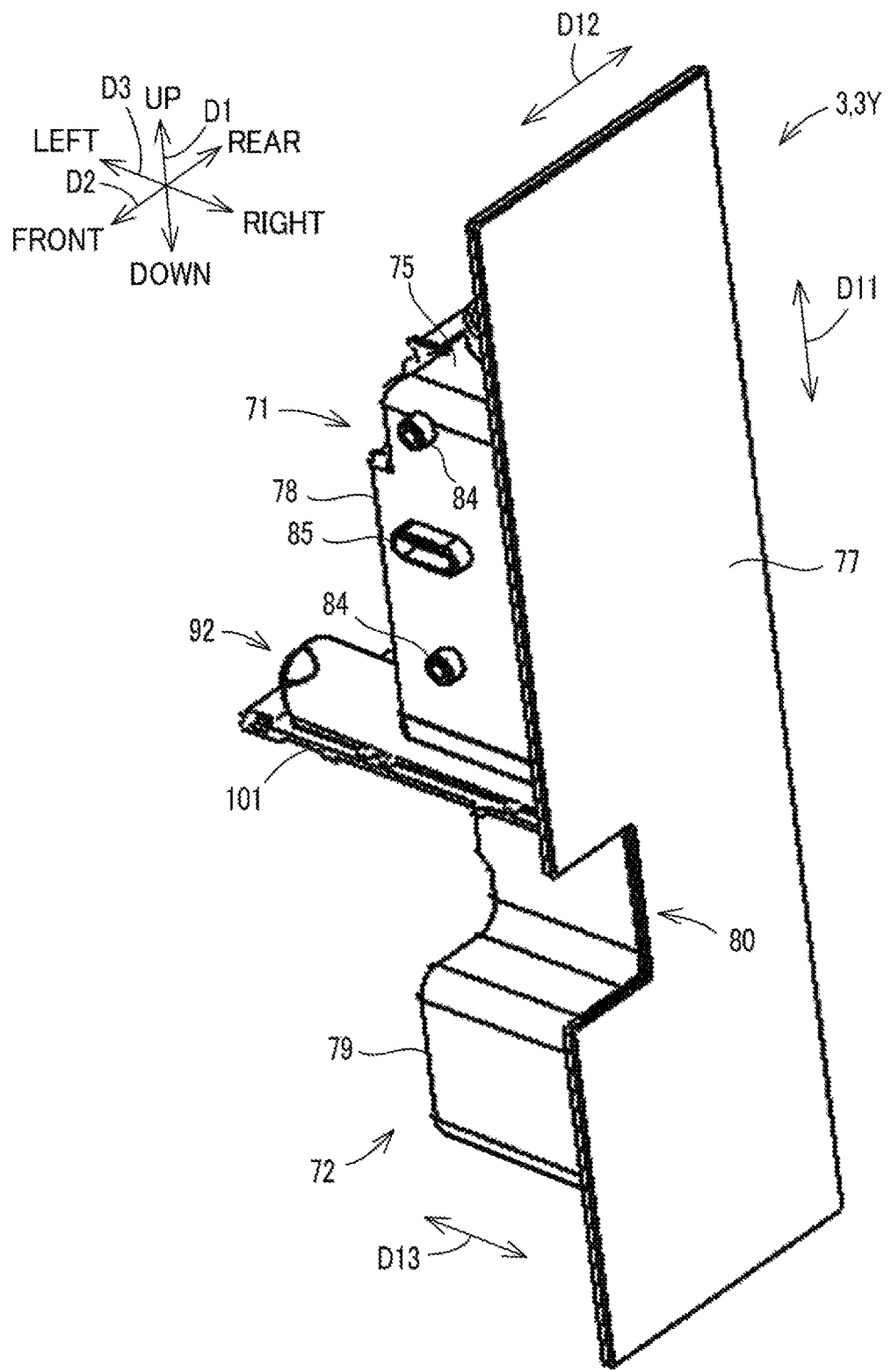
FIG. 5 is a perspective diagram of a toner container viewed from an exterior panel side.
Figure 6:
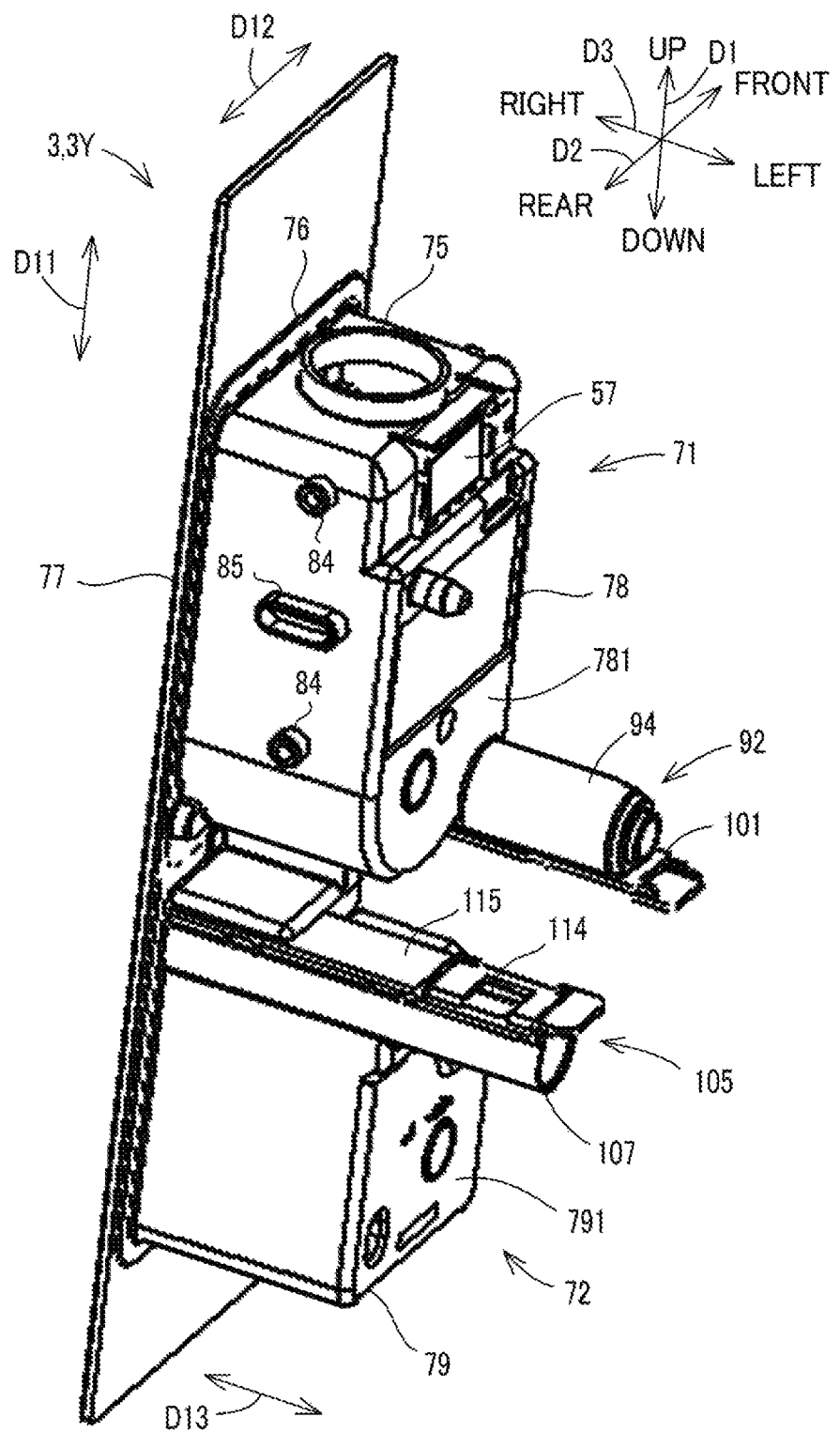
FIG. 6 is a perspective diagram of the toner container viewed from a container main body side.

FIG. 5 is a perspective diagram of the toner container 3Y viewed from the exterior panel 77 side. FIG. 6 is a perspective diagram of the toner container 3Y viewed from a container main body 75 side. It is noted that in FIG. 5 and FIG. 6, the up-down direction D1, the front-rear direction D2, and the left-right direction D3 are shown based on an attachment attitude of the toner container 3Y attached to the attachment portion 58 (see FIG. 3). In addition, in the following description, with respect to the toner container 3Y in the attachment attitude, the up-down direction D1 is defined as a height direction D11 of the toner container 3Y, the front-rear direction D2 is defined as a width direction D12 of the toner container 3Y, and the left-right direction D3 is defined as a depth direction D13 of the toner container 3Y.

As shown in FIG. 5 and FIG. 6, the toner container 3Y includes the container main body 75. The container main body 75 is a resin molding product molded with a synthetic resin by injection molding. The container main body 75 is formed to be elongated in the height direction D11, wide in the width direction D12, and shallow in the depth direction D13.

The container main body 75 includes an upper case 78 (first housing) formed at an upper position of the container main body 75, a lower case 79 (second housing) formed at a lower position of the container main body 75, a lid 76 (see FIG. 6, lid member), and the exterior panel 77 (an example of an exterior member of the present disclosure). That is, the upper case 78 is formed on one side (upper side) in the height direction D11 (longitudinal direction) of the container main body 75, and the lower case 79 is formed on the other side (lower side) in the height direction D11 of the container main body 75.

An opening portion is formed in the right side surface of each of the upper case 78 and the lower case 79. The opening portions are formed on the same plane. A flange is formed at an opening edge of each of the opening portions. Each of the opening portions is closed by the lid 76 (see FIG. 6) of a flat plate shape. For example, the lid 76 and the flange are welded to each other. The upper storage portion 71 having a storage space for storing the unused toner is formed when the opening portion of the upper case 78 is closed with the lid 76. In addition, the lower storage portion 72 having a storage space for storing the waste toner is formed when the opening portion of the lower case 79 is closed with the lid 76.

As shown in FIG. 6, the upper storage portion 71 includes a first conveyance portion 92. The first conveyance portion 92 includes a cylindrical first conveyance guide portion 94 and a spiral member (not shown), wherein the first conveyance guide portion 94 extends outward from a left wall surface 781 of the upper case 78, and the spiral member is provided inside the first conveyance guide portion 94 and functions as a toner conveying member. The first conveyance guide portion 94 is integrally formed with the upper case 78, and has the shape of a cylinder whose center is the same as a rotation center of the spiral member. Here, the wall surface 781 is located on one side in the depth direction D13 of the toner container 3Y with respect to the attachment portion 58, and faces the attachment portion 58 when the toner container 3Y is attached to the attachment portion 58. It is noted that the depth direction D13 matches the attachment/detachment direction of the toner container 3Y with respect to the attachment portion 58.

The spiral member has a spiral blade formed around an axis of a rotation shaft, and is rotatably provided inside the first conveyance guide portion 94. An input portion is integrally formed with a tip of the rotation shaft, the input portion receiving a rotational driving force that is input from outside. Upon being rotated by the rotational driving force received from the input portion, the spiral member conveys the unused toner from the inside of the upper storage portion 71 to the attachment portion 58 side (see FIG. 5) through the inside of the first conveyance guide portion 94, and guides the unused toner to the secondary transfer roller 33 through a toner discharge port (not shown).

In addition, on the lower surface of the first conveyance guide portion 94, a shutter member 101 (opening and closing member) for opening and closing the toner discharge port is provided. The shutter member 101 is supported by the first conveyance guide portion 94 in such a manner that the shutter member 101 can slide on the lower surface of the first conveyance guide portion 94 in the longitudinal direction of the first conveyance guide portion 94. When the toner container 3Y is attached to the attachment portion 58 (see FIG. 3), the shutter member 101 is moved from a closing position of closing the toner discharge port, to an opening position of opening the toner discharge port. With the shutter member 101 at the opening position, the toner discharge port is connected to a supply port of the secondary transfer roller 33, and the toner can be supplied from the toner discharge port to the supply port.

The IC memory 57 is attached to the wall surface 781 of the upper case 78. The IC memory 57 is a contactless memory. The IC memory 57, also called an RFID tag, performs a communication with the reader 130 (see FIG. 4) described below to perform a data transfer upon receiving a specific electric wave therefrom. As described above, the IC memory 57 stores the identification information of the toner container 3.

As shown in FIG. 6, the lower storage portion 72 includes a second conveyance portion 105. The second conveyance portion 105 conveys yellow waste toner discharged from the drum cleaning device 42, to the inside of the lower storage portion 72. The second conveyance portion 105 includes a cylindrical second conveyance guide portion 107 and a spiral member (not shown), wherein the second conveyance guide portion 107 extends outward from a left wall surface 791 of the lower case 79, and the spiral member is provided inside the second conveyance guide portion 107 and functions as a toner conveying member. The second conveyance guide portion 107 is integrally formed with the lower case 79, and has the shape of a cylinder whose center is the same as a rotation center of the spiral member.

The spiral member is a conveyance member for conveying the waste toner that has been discharged from the drum cleaning device 42 to the second conveyance guide portion 107, to the inside of the lower storage portion 72 through the second conveyance guide portion 107. In addition, the second conveyance guide portion 107 receives the waste toner from the drum cleaning device 42, and guides the waste toner conveyed by the spiral member, to the inside of the lower storage portion 72.

The spiral member has a spiral blade formed around an axis of a rotation shaft, and is rotatably provided in the second conveyance guide portion 107. An input portion is integrally formed with a tip of the rotation shaft, the input portion receiving a rotational driving force that is input from outside. Upon being rotated by the rotational driving force received from the input portion, the spiral member conveys the waste toner in the second conveyance guide portion 107 to the inside of the lower storage portion 72.

A toner inlet 114 for guiding the waste toner to the inside of the second conveyance guide portion 107 is formed on the upper surface of the second conveyance guide portion 107. In addition, on the upper surface of the second conveyance guide portion 107, a shutter member 115 for opening and closing the toner inlet 114 is provided. The shutter member 115 is supported by the second conveyance guide portion 107 such that the upper surface of the second conveyance guide portion 107 can be slid in the longitudinal direction of the second conveyance guide portion 107. When the toner container 3Y is attached to the attachment portion 58 (see FIG. 3), the shutter member 115 is moved from a closing position of closing the toner inlet 114, to an opening position of opening the toner inlet 114. This allows the toner inlet 114 to be connected to the toner discharge port of the drum cleaning device 42 so that the waste toner can be introduced from the toner discharge port into the toner inlet 114.

As shown in FIG. 5, the exterior panel 77 has a flat plate shape that is approximately rectangular and elongated in the height direction D11. The exterior panel 77 is made of the same material as the housing 11 of the image forming apparatus 10, and, for example, has the same color as the housing 11. The exterior panel 77 is larger than the lid 76 (see FIG. 6) in size, and is attached to an outer surface of the lid 76. The surface of the exterior panel 77 is flat. In the present embodiment, as shown in FIG. 3, in an attachment state where the toner container 3Y is attached to the attachment portion 58, the exterior panel 77 of the toner container 3Y constitutes a part of the exterior of the right side surface 11A of the housing 11.

In the exterior panel 77, a rectangular cut 80 is formed at a side portion on one side in the width direction D12 (a side portion on the front side). A pressing surface portion 691 of an operation member 69 (see FIG. 7, an example of an operation member of the present disclosure) which is described below, is placed in the cut 80. In the state where the toner container 3Y is attached to the attachment portion 58, the pressing surface portion 691 is flush with the outer surface of the exterior panel 77, and constitutes a part of the exterior of the right side surface 11A of the housing 11.

As shown in FIG. 5 and FIG. 6, two projecting bosses 84 are formed on each of side surfaces 782 of the upper case 78 that are opposite to each other in the width direction D12, the two projecting bosses 84 being separated from each other in the height direction D11. The projecting bosses 84 are an example of an engaging piece of the present disclosure. The projecting bosses 84 are integrally formed with the upper case 78. Two projecting bosses 84 are formed on the side surface 782 of the front side, and two projecting bosses 84 are formed on the side surface 782 of the rear side. When the toner container 3Y is attached to a predetermined attachment position in the attachment portion 58, the projecting bosses 84 are engaged with hooks 652 included in a moving frame 65 described below, and the projecting bosses 84 are locked in the attachment/detachment direction of the toner container 3Y with respect to the attachment portion 58. Specifically, in the state where the toner container 3Y is attached to the attachment portion 58, the projecting bosses 84 are hooked and engaged with lock grooves 657 of the hooks 652 described below, and the projecting bosses 84 are locked in the attachment/detachment direction. It is noted that the attachment/detachment direction matches the left-right direction D3, is perpendicular to the right side surface 11A of the housing 11, and corresponds to a first direction of the present disclosure.

On each of the side surfaces 782 of the upper case 78, an elongated boss 85 is formed to project therefrom. The elongated boss 85 is elongated in the depth direction D13. One elongated boss 85 is formed. On each side surface 782, the elongated boss 85 is located approximately in the middle of the two projecting bosses 84 that are separated from each other in the height direction D11. The projecting bosses 84 are provided so that when the toner container 3Y is attached to the predetermined attachment position in the attachment portion 58, the toner container 3Y is positioned in the up-down direction D1 in the attachment portion 58. Specifically, in the state where the toner container 3Y is attached to the attachment portion 58, the elongated boss 85 is inserted in a positioning groove 614 formed in a support frame 61 described below such that the elongated boss 85 is positioned in the up-down direction D1.

The following describes a configuration of the attachment portions 58 to which the toner containers 3 are attached. It is noted that in the present embodiment, four attachment portions 58 are provided in correspondence with the four toner containers 3, and the four attachment portions 58 have the same configuration.

Figure 7:
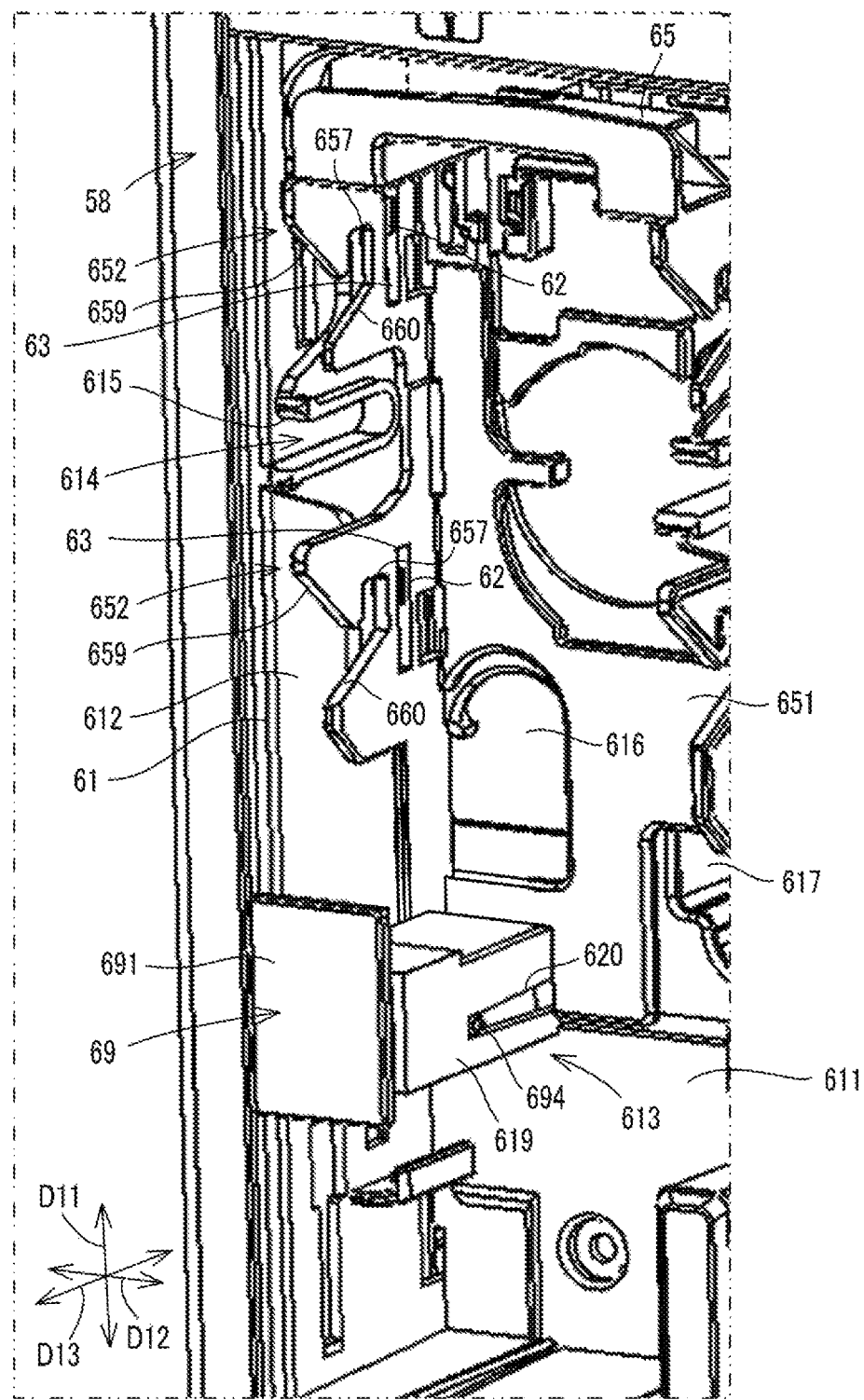
FIG. 7 is an enlarged perspective diagram showing an attachment portion to which the toner container is attached.
Figure 8:
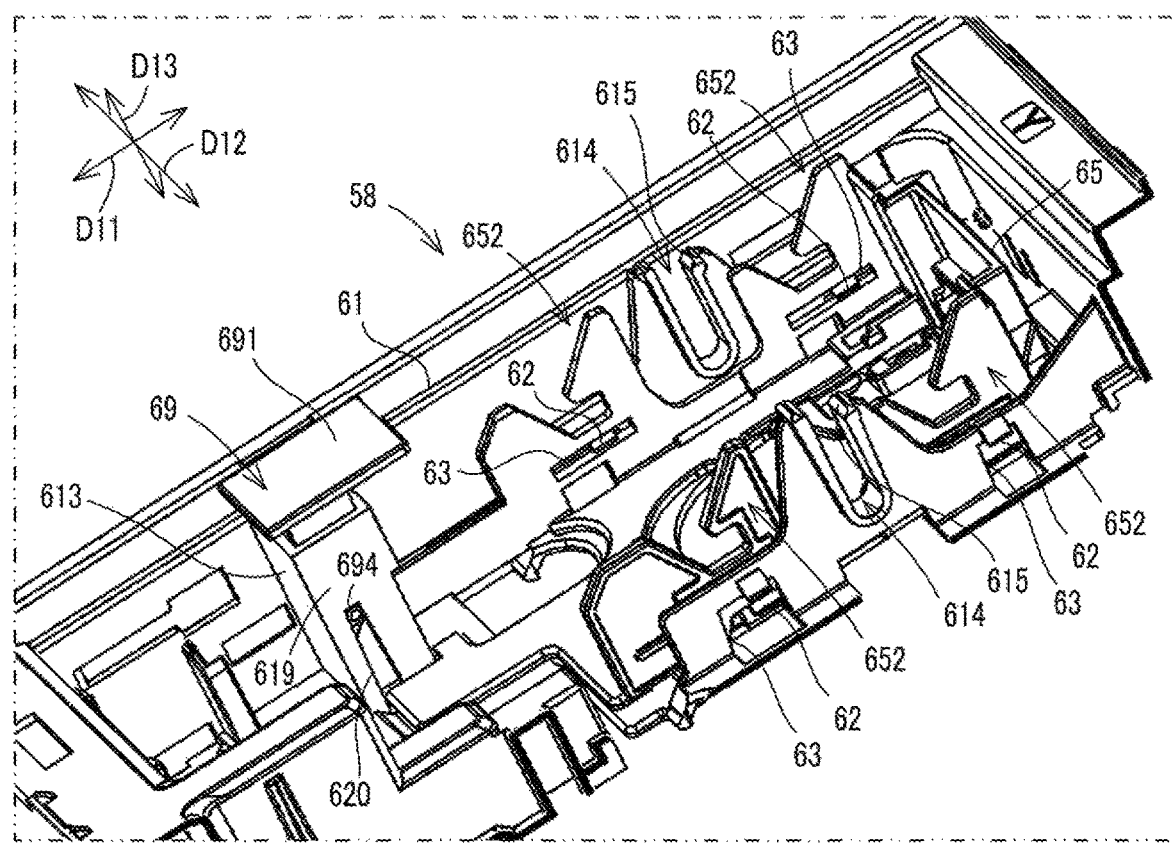
FIG. 8 is a perspective diagram showing a state where a moving frame is located at an unlock position in the attachment portion.

FIG. 7 is an enlarged perspective diagram showing the attachment portion 58 to which the toner container 3 is attached. FIG. 8 is a perspective diagram showing how a moving frame 65 is arranged in the attachment portion 58. FIG. 8 shows a state where the moving frame 65 is arranged at an unlock position to unlock the toner container 3.

The attachment portion 58 supports the toner container 3 so that the toner container 3 can be moved between the attachment position and the detachment position. The attachment portion 58 holds the toner container 3 in the state where the toner container 3 is locked to the attachment position. Here, the attachment position is provided inside the right side surface 11A of the housing 11. The detachment position is separated from the attachment position toward the right side surface 11A by a predetermined distance.

As shown in FIG. 7, the attachment portion 58 includes the support frame 61 (an example of a support member of the present disclosure), the moving frame 65 (an example of a lock member of the present disclosure), and a coil spring 68 (an example of an elastic member of the present disclosure). These members are, for example, made of a synthetic resin.

Figure 9:
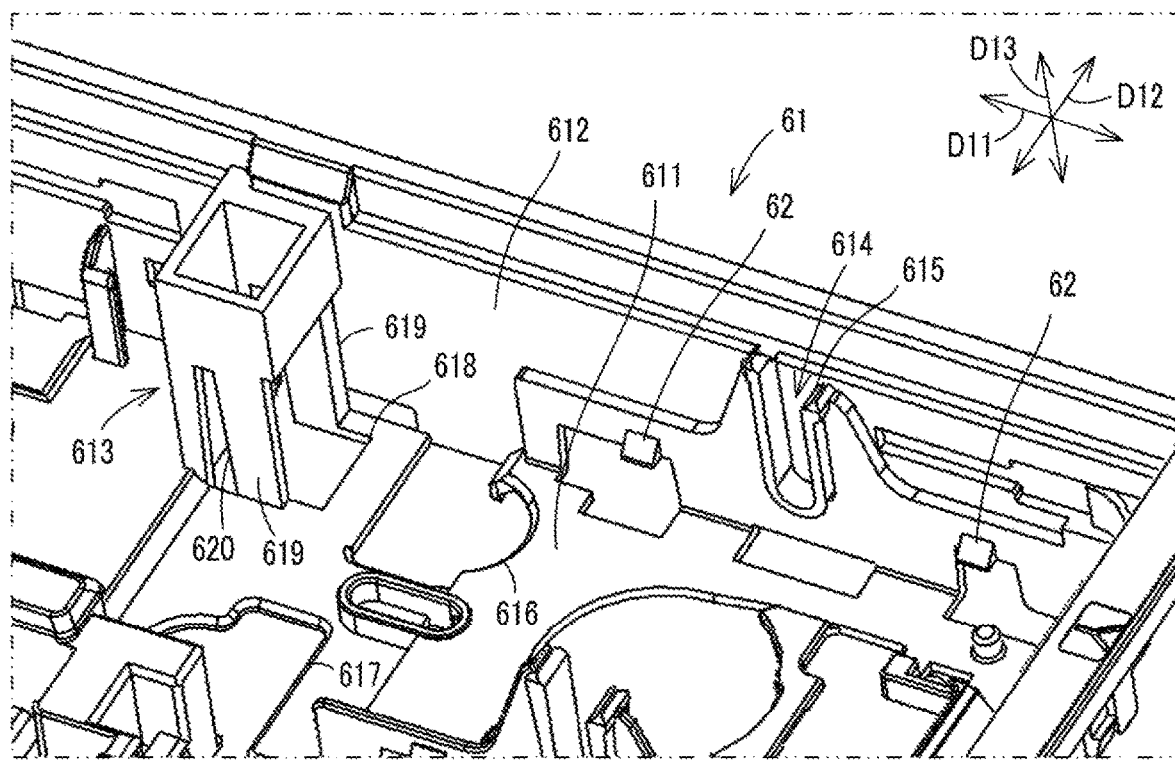
FIG. 9 is an enlarged perspective diagram showing a main part of a support frame of the attachment portion.

The support frame 61 is fixed to an internal frame of the housing 11. The support frame 61 supports the toner container 3 so that the toner container 3 can be moved between the attachment position and the detachment position. FIG. 9 shows a state where the moving frame 65 and the operation member 69 have been removed from the attachment portion 58, and shows a configuration of the support frame 61. As shown in FIG. 9, the support frame 61 includes a bottom plate 611, side plates 612, and a holder 613, wherein the moving frame 65 is disposed on the bottom plate 611, the side plates 612 are erected from opposite ends of the bottom plate 611 that are opposite to each other in the width direction D12, and the holder 613 has a shape of a rectangular tube and protrudes from the bottom plate 611.

The positioning grooves 614 in which the elongated bosses 85 of the toner container 3 are inserted are formed in the inner surfaces of the side plates 612. The positioning grooves 614 extend in the side plates 612 in the depth direction D13, and have openings 615 at ends of the side plates 612 that are far away from the bottom plate 611 (at the upper side in FIG. 9). When the toner container 3 is attached to the attachment portion 58, the elongated bosses 85 are inserted in the positioning grooves 614 from the openings 615. This allows the elongated bosses 85 to be guided in the extension direction of the positioning grooves 614, allowing the toner container 3 to be moved between: the attachment position where the elongated bosses 85 are disposed deep inside the positioning grooves 614; and the detachment position where the elongated bosses 85 are disposed closer to the openings 615 than to the attachment position.

In addition, when the elongated bosses 85 are inserted in the positioning grooves 614, the elongated bosses 85 are positioned in the up-down direction D1, and the toner container 3 is positioned in the up-down direction D1. This prevents the toner container 3 from being displaced in the up-down direction D1. In addition, an opening 616 (see FIG. 9) and an opening 617 (see FIG. 9) are formed in the bottom plate 611, wherein the first conveyance portion 92 and the second conveyance portion 105 are respectively inserted in the opening 616 and the opening 617 when the toner container 3 is attached.

The holder 613 is configured to hold the operation member 69. Guide grooves 620 that extend in the depth direction D13 are formed in side walls 619 of the holder 613 that are opposite to each other in the width direction D12. Guide pins 694 (see FIG. 10) of the operation member 69 are inserted in the guide grooves 620 so that the operation member 69 is supported by the holder 613 in such a way as to be movable in the depth direction D13. An opening 618 (see FIG. 9) is formed in the bottom plate 611 at a position corresponding to the holder 613. When the operation member 69 is operated, a tip portion 695 of the operation member 69 is inserted through the opening 618 to the rear surface side of the bottom plate 611.

Figure 10:
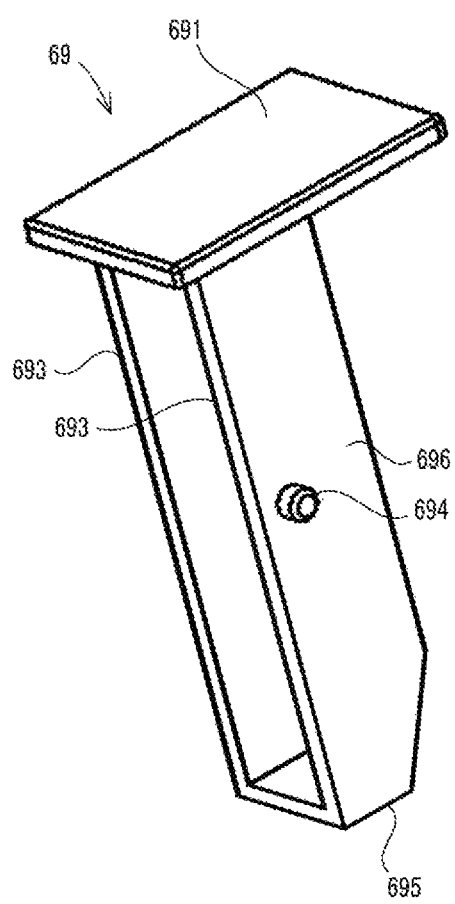
FIG. 10 is an enlarged perspective diagram showing an operation member used to detach the toner container.

The operation member 69 is attached to the holder 613. FIG. 10 is an enlarged perspective diagram of the operation member 69 that is used to remove the toner container 3. As shown in FIG. 10, the operation member 69 includes the pressing surface portion 691, a pair of push arms 693, and guide pins 694, wherein the pressing surface portion 691 has a pressing surface that is pressed by the user, the pair of push arms 693 extend orthogonally from the pressing surface portion 691, and each of the guide pins 694 is provided on an outer side surface of each of the push arms 693. As described above, the pressing surface portion 691 is flush with the outer surface of the exterior panel 77, and constitutes a part of the exterior of the right side surface 11A of the housing 11. As a result, the pressing surface portion 691 is made of the same material as the housing 11 of the image forming apparatus 10, and, for example, has the same color as the housing 11.

The push arms 693 of the operation member 69 are inserted into the holder 613 through the openings formed at the projection end of the holder 613, and the guide pins 694 are inserted in the guide grooves 620. This allows the operation member 69 to be supported in such a way as to be movable in the depth direction D13 with respect to the holder 613.

Figure 12:
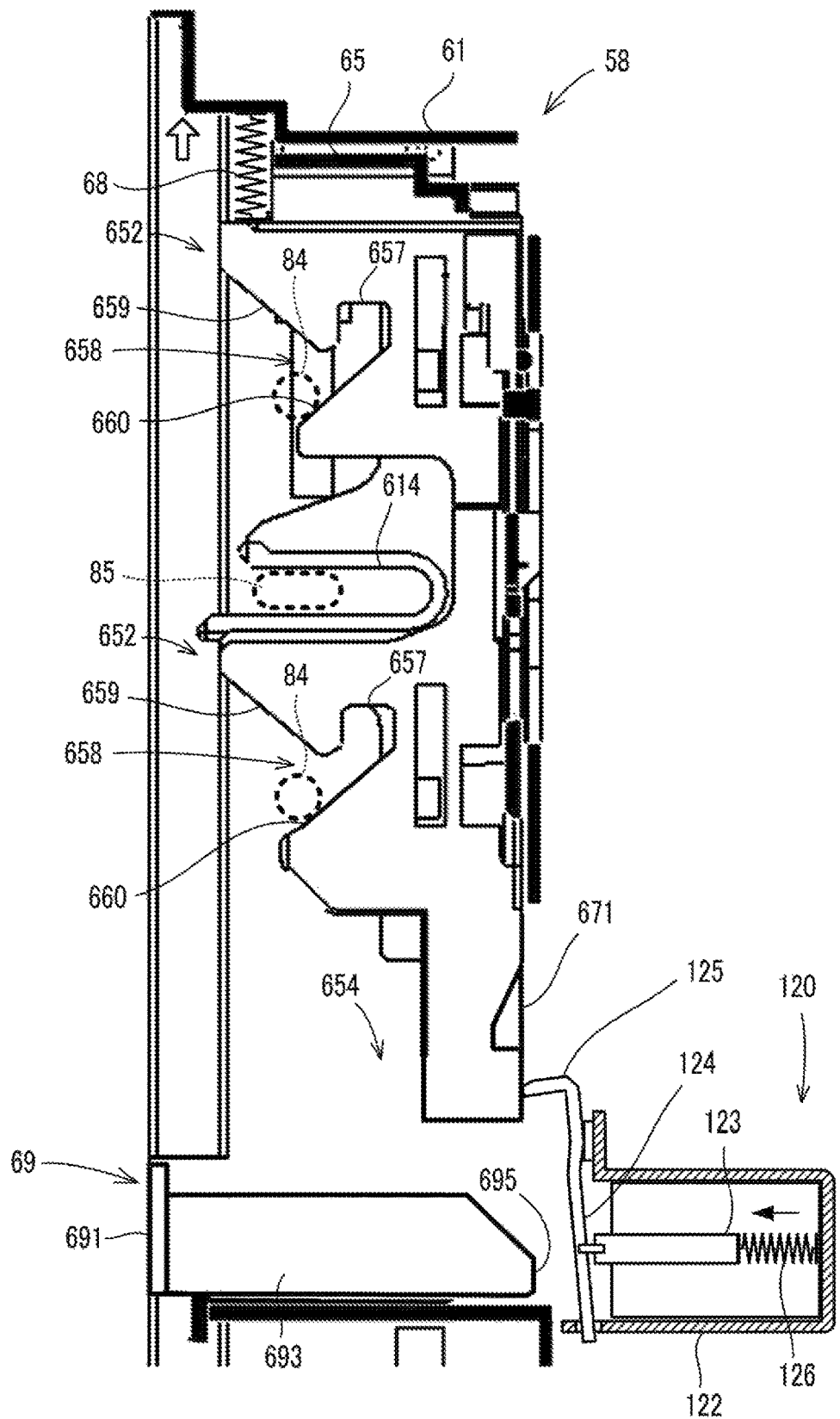
FIG. 12 is a side diagram showing a positional relationship between the toner container and the support frame, and an engagement relationship between the moving frame and a cam, wherein the moving frame is located at the unlock position, and the toner container is located at the detachment position.
Figure 14:
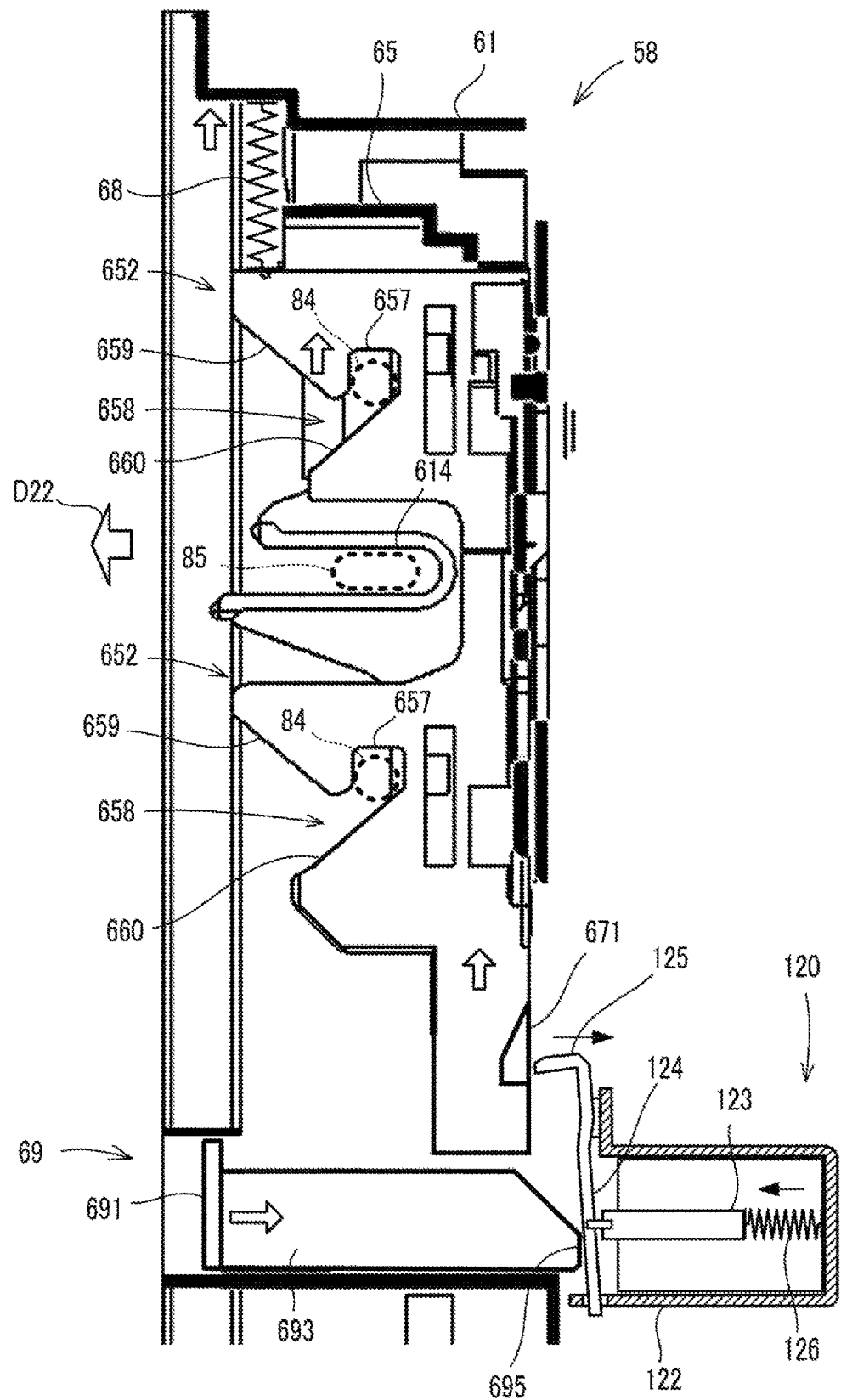
FIG. 14 is a side diagram showing a positional relationship between the toner container and the support frame, and an engagement relationship between the moving frame and the cam, wherein the operation member has been pushed in and a restriction imposed by the moving frame has been removed.

In the present embodiment, the operation member 69 is supported in such a way as to be movable between a first position and a second position. FIG. 8 and FIG. 12 show the operation member 69 at the first position where the moving frame 65 is at the unlock position, and the tip portion 695 of the push arms 693 is separated from the actuator 124 (see FIG. 12) that is described below. In addition, FIG. 14 shows the operation member 69 at the second position that is more on the depth side than the first position, where the tip portion 695 presses and moves the actuator 124 to a non-engaging position that is described below.

As shown in FIG. 7, the moving frame 65 is provided on the support frame 61. The moving frame 65 is supported by the support frame 61 in such a way as to be slidable in the height direction D11. The height direction D11 matches the up-down direction D1 in the state where the toner container 3 is attached to the attachment portion 58, and corresponds to a second direction of the present disclosure that extends along the right side surface 11A of the housing 11.

As shown in FIG. 9, engaging claws 62 are formed at some locations of the support frame 61. In addition, as shown in FIG. 8, long holes 63 in which the engaging claws 62 are inserted, are formed at some locations of the moving frame 65. When the engaging claws 62 are inserted in and engaged with the long holes 63, the moving frame 65 is supported by the support frame 61 in such a way as to be movable in the height direction D11. In addition, when the engaging claws 62 are engaged with edge portions of the long holes 63, the moving frame 65 is engaged with the support frame 61 in the depth direction D13.

Figure 13:
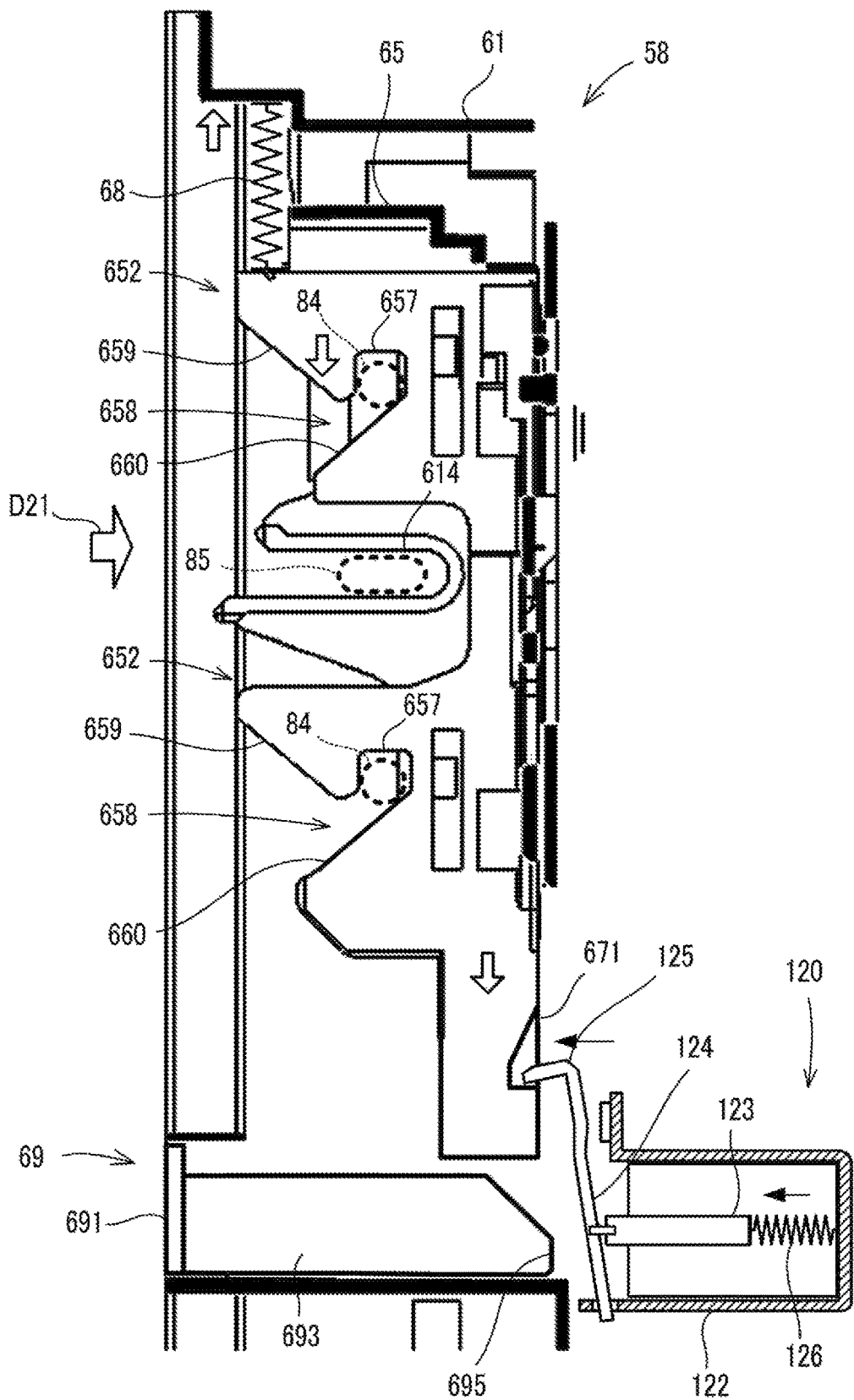
FIG. 13 is a side diagram showing a positional relationship between the toner container and the support frame, and an engagement relationship between the moving frame and the cam, wherein the moving frame is located at the lock position, and the toner container is located at the attachment position.

The moving frame 65 is configured to move between the unlock position shown in FIG. 8 and FIG. 12 and a lock position shown in FIG. 13. When the moving frame 65 is at the lock position, the projecting bosses 84 of the toner container 3 are locked in the depth direction D13. In addition, when the moving frame 65 is at the unlock position, the projecting bosses 84 are unlocked in the depth direction D13.

Figure 11:
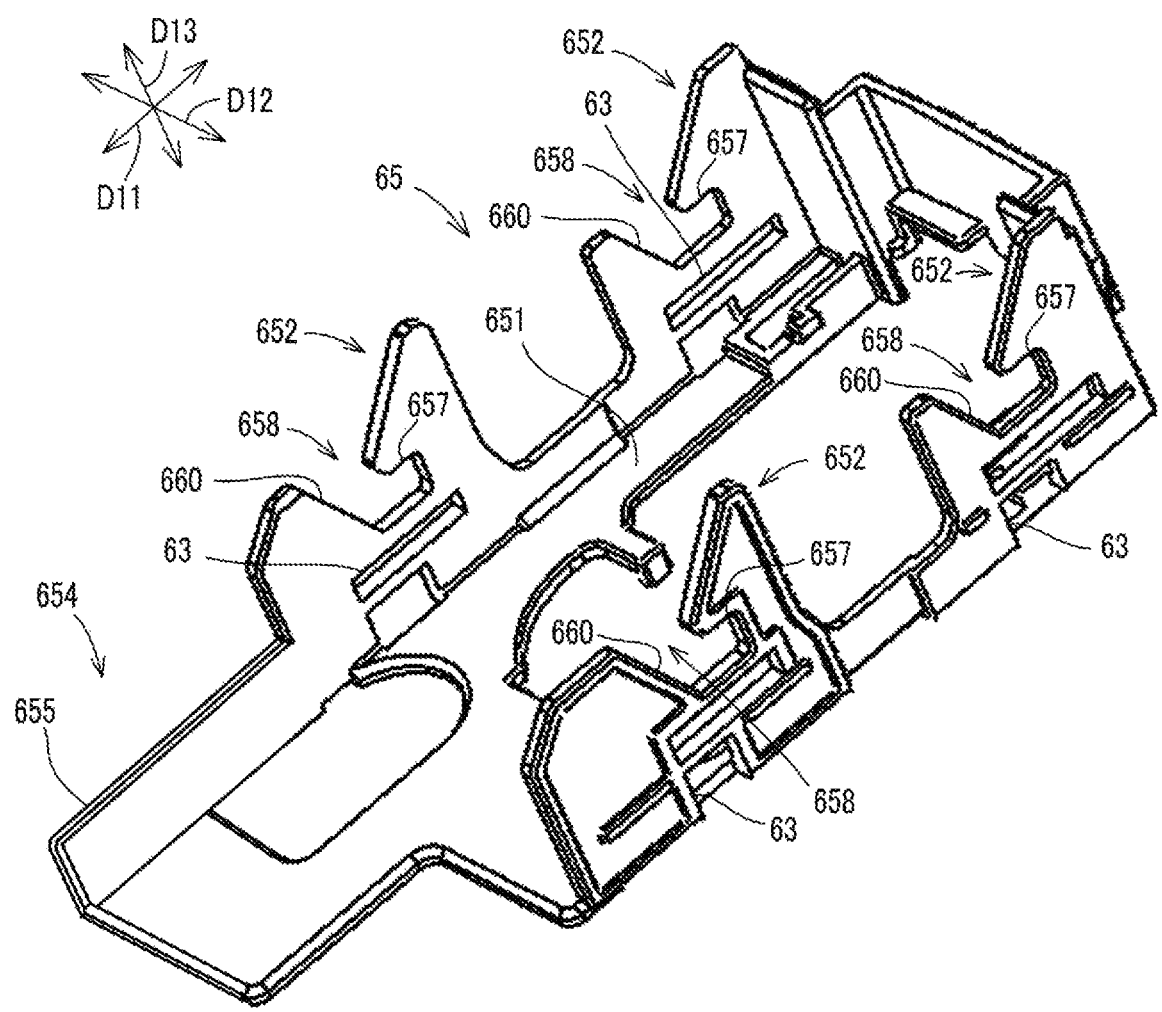
FIG. 11 is a perspective diagram showing the moving frame of the attachment portion.

FIG. 11 is a perspective diagram showing the moving frame 65 of the attachment portion 58. As shown in FIG. 11, the moving frame 65 includes a base plate 651 and the hooks 652 (an example of a hook portion of the present disclosure), wherein the base plate 651 is disposed to face the bottom plate 611 of the support frame 61, and the hooks 652 are downward hooks and are erected from ends of the base plate 651 that are opposite to each other in the width direction D12. A plurality of openings are formed in the base plate 651 such that a plurality of portions such as the first conveyance portion 92 and the second conveyance portion 105 of the toner container 3 can be inserted in the openings.

The moving frame 65 includes four hooks 652. The four hooks 652 are respectively engaged with the four projecting bosses 84 of the toner container 3 in the depth direction D13 in the state where the toner container 3 is attached to the attachment portion 58.

As shown in FIG. 11, each of the hooks 652 includes the lock groove 657 in which the projecting boss 84 is inserted when the toner container 3 is attached. The lock grooves 657 extend in the height direction D11.

Cams 660 (an example of a pressing portion of the present disclosure) are provided to face the hooks 652 in the height direction D11. The cams 660 are provided below the hooks 652 so that openings 658 of the lock grooves 657 are formed between the hooks 652 and the cams 660. The cams 660 are an example of a cam portion of the present disclosure. The cams 660 are inclined toward the openings 658 of the lock grooves 657. The cams 660 are inclined diagonally downward toward the exterior panel 77. When the toner container 3 is attached, the toner container 3 is pressed into the housing 11 from the right side surface 11A side. In response to the pressing of the toner container 3, the cams 660 press the moving frame 65 from the unlock position (the position shown in FIG. 8 and FIG. 12) to the lock position (the position shown in FIG. 13).

The cams 660 are inclined cams, and are inclined approximately 45 degrees. When the toner container 3 is inserted in the attachment portion 58 in the attachment direction in a state where the toner container 3 is not attached to the attachment portion 58, the projecting bosses 84 abut on the cams 660.

In the present embodiment, the coil spring 68 (see FIG. 12) is provided in the attachment portion 58. The coil spring 68 elastically biases the moving frame 65 toward the unlock position (upward) in a state where no other external force is applied to the moving frame 65. The coil spring 68 is what is called a tension spring, and applies, to the moving frame 65, a force that pulls up the moving frame 65 toward the unlock position. As shown in FIG. 12, the coil spring 68 is provided between an upper side wall of the support frame 61 and an upper side wall of the moving frame 65. With this configuration, in the state where no other external force is applied to the moving frame 65, the moving frame 65 is kept to be at the unlock position.

When the toner container 3 is attached, the projecting bosses 84 abut on the cams 660, and when, in the state where the projecting bosses 84 abut on the cams 660, the toner container 3 is further inserted in a direction indicated by the arrow D21 in FIG. 13, the cams 660 convert the pressing force in the insertion direction received from the projecting bosses 84, into a pressing force that moves the moving frame 65 downward (toward the lock position). As a result, the moving frame 65 receives the downward pressing force, and moves from the unlock position toward the lock position against the biasing force (tensile force) of the coil spring 68. When the toner container 3 is further inserted, the projecting bosses 84 are guided into the lock grooves 657. The projecting bosses 84 then enter the lock grooves 657 through the openings 658. The projecting bosses 84 that have entered the lock grooves 657 are locked in the depth direction D13 by the hooks 652.

When the projecting bosses 84 enter the lock grooves 657, and the toner container 3 reaches the attachment position, the actuator 124 (see FIG. 12) described below is engaged with the moving frame 65, and the movement of the moving frame 65 is restricted. This allows the toner container 3 to be held at the attachment position. That is, the toner container 3 is locked to the attachment position. In the state where the toner container 3 is attached to the attachment portion 58, the surface of the exterior panel 77 is flush with the right side surface 11A of the housing 11.

When the restriction imposed by the moving frame 65 is removed by the actuator portion 120 described below, and the moving frame 65 is moved from the lock position to the unlock position, the cams 660 press the toner container 3 from the attachment position to the detachment position. When the moving frame 65 is moved from the lock position to the unlock position, the cams 660, in response to the movement of the moving frame 65, press the projecting bosses 84 in a direction (the direction indicated by the arrow D22 in FIG. 14) opposite to the insertion direction of the toner container 3, and move the toner container 3 from the attachment position to the detachment position. The cams 660 that move the toner container 3 to the detachment position as described here, are an example of a moving mechanism of the present disclosure.

Specifically, as shown in FIG. 14, when the moving frame 65 is moved by the actuator portion 120 from the lock position with which the toner container 3 is attached and locked to the attachment portion 58, toward the unlock position (downward), the cams 660 abut on the projecting bosses 84 that move from the lock grooves 657 toward the openings 658 relative to the movement of the moving frame 65, and when the moving frame 65 is further moved toward the unlock position (downward) in the state where the cams 660 abut on the projecting bosses 84, the cams 660 convert the downward pressing force received from the moving frame 65 into a pressing force of a direction (the direction indicated by the arrow D22 in FIG. 14) opposite to the insertion direction of the toner container 3, and apply the force to the projecting bosses 84. When the projecting bosses 84 receive the pressing force, the toner container 3 moves from the attachment position toward the detachment position (see FIG. 14).

Figure 15:
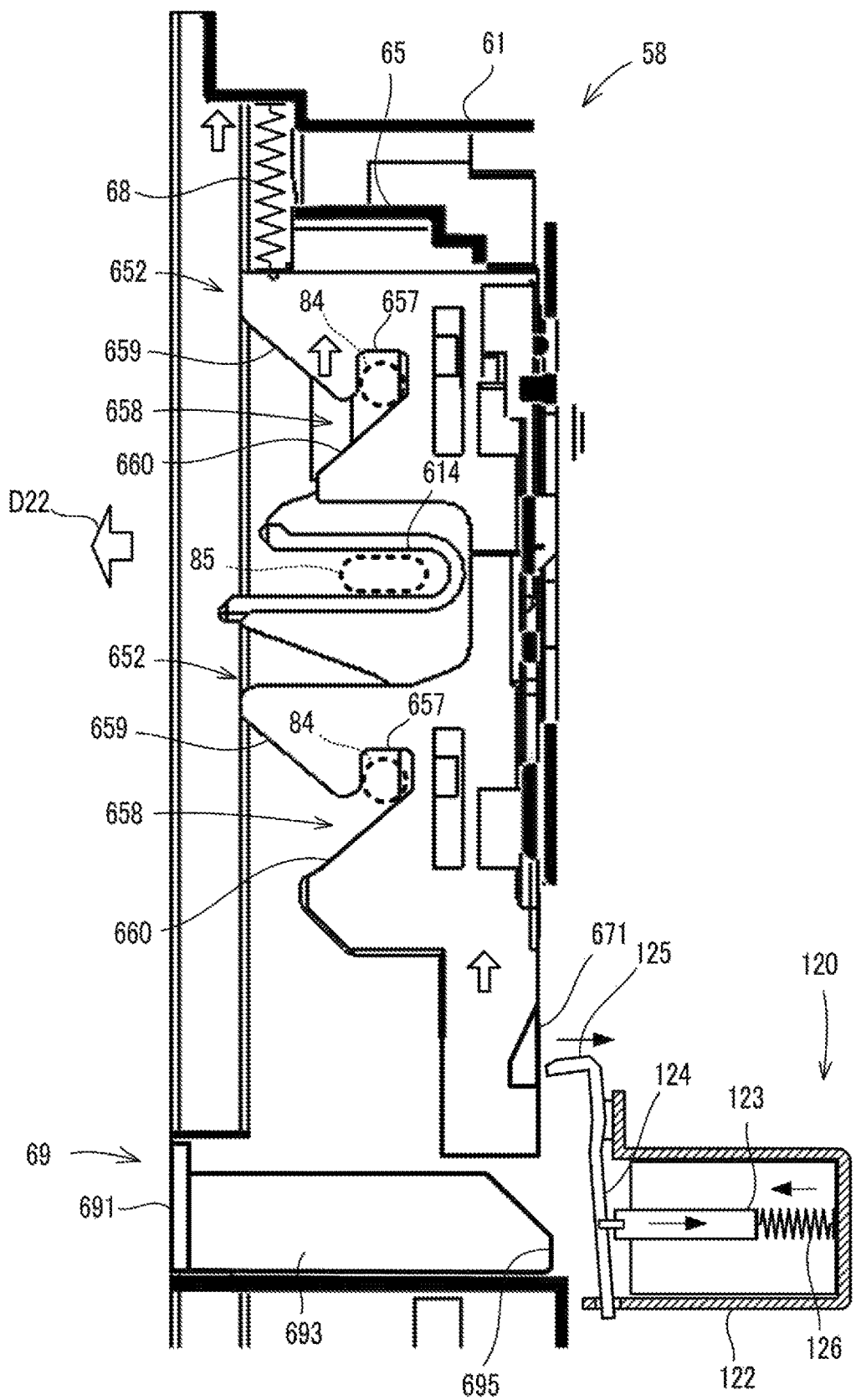
FIG. 15 is a side diagram showing a positional relationship between the toner container and the support frame, and an engagement relationship between the moving frame and the cam, wherein an engagement by an actuator portion has been removed, and the restriction imposed by the moving frame has been removed.

The following describes the configuration and operation of the actuator portion 120 which is an example of a lock drive portion of the present disclosure, with reference to FIG. 12 to FIG. 16. It is noted that in the present embodiment, the actuator portion 120 is provided in each of the four attachment portions 58. Here, FIG. 12 to FIG. 15 are side diagrams showing the positional relationship between the toner container 3 and the support frame 61, and the engagement relationship between the moving frame 65 and the cams 660. FIG. 12 shows a state where the moving frame 65 is located at the unlock position, and the toner container 3 is located at the detachment position. FIG. 13 shows a state where the moving frame 65 is located at the lock position, and the toner container 3 is located at the attachment position. FIG. 14 shows a state where the operation member 69 has been pushed in, and the restriction imposed by the moving frame 65 has been removed. FIG. 15 shows a state where the engagement by the actuator portion 120 has been removed, and the restriction imposed by the moving frame 65 has been removed.

The actuator portion 120 is configured to, when the toner container 3 is located at the attachment position, acquire the identification information from the IC memory 57, and upon determining, based on the identification information, that the toner container 3 has an attachment compatibility, place the moving frame 65 at the lock position, and upon determining that the toner container 3 does not have the attachment compatibility, place the moving frame 65 at the unlock position.

As shown in FIG. 12, the actuator portion 120 includes the actuator 124 (an example of an engaging member of the present disclosure), the solenoid 122 (an example of a drive portion and an electric motor of the present disclosure), and the above-described control portion 26.

The actuator 124 is displaced between an engaging position (see FIG. 13) and a non-engaging position (see FIG. 14 and FIG. 15), wherein at the engaging position, the actuator 124 is engaged with the moving frame 65 and holds the moving frame 65 at the lock position, and when the actuator 124 is located at the non-engaging position, the engagement with the moving frame 65 is removed. The actuator 124 is formed in an elongated arm shape, and its one end (lower end) is pivotably supported by the frame of the solenoid 122. A hook 125 is provided at the other end (upper end) of the actuator 124, wherein the hook 125 is inserted in an engaging groove 671 formed in a rear surface of the base plate 651. The hook 125 can be inserted in the engaging groove 671 when the moving frame 65 is located at the lock position.

The solenoid 122 supplies a driving force to the actuator 124 to cause it to operate. The solenoid 122 includes a plunger 123 that operates upon being energized. A tip of the plunger 123 is connected to the actuator 124. In a non-energized state where the solenoid 122 is not energized, the solenoid 122 biases the actuator 124 toward the engaging position. When the solenoid 122 is energized (driven and controlled) by the control portion 26, the solenoid 122 displaces the actuator 124 to the non-engaging position. The solenoid 122 includes, in the inside, a coil spring 126 that biases the plunger 123 toward the actuator 124. The coil spring 126 is what is called a compression spring. As a result, as shown in FIG. 12 and FIG. 13, in the non-energized state, the solenoid 122 biases the actuator 124 toward the engaging position by the spring force. On the other hand, when the solenoid 122 is energized, as shown in FIG. 15, the solenoid 122 pushes the plunger 123 into the inside of the solenoid 122 against the spring force of the coil spring 126. This allows the actuator 124 to be displaced from the engaging position to the non-engaging position.

The control portion 26 executes the unlocking process described below to read identification information of the toner container 3 from the IC memory 57, and controls the solenoid 122 based on the identification information to displace the actuator 124 to the non-engaging position and place the moving frame 65 at the unlock position. In the present embodiment, the control portion 26 energizes and drives the solenoid 122 when the control portion 26 determines, based on the identification information, that the toner container 3 does not have the attachment compatibility.

Figure 16A:
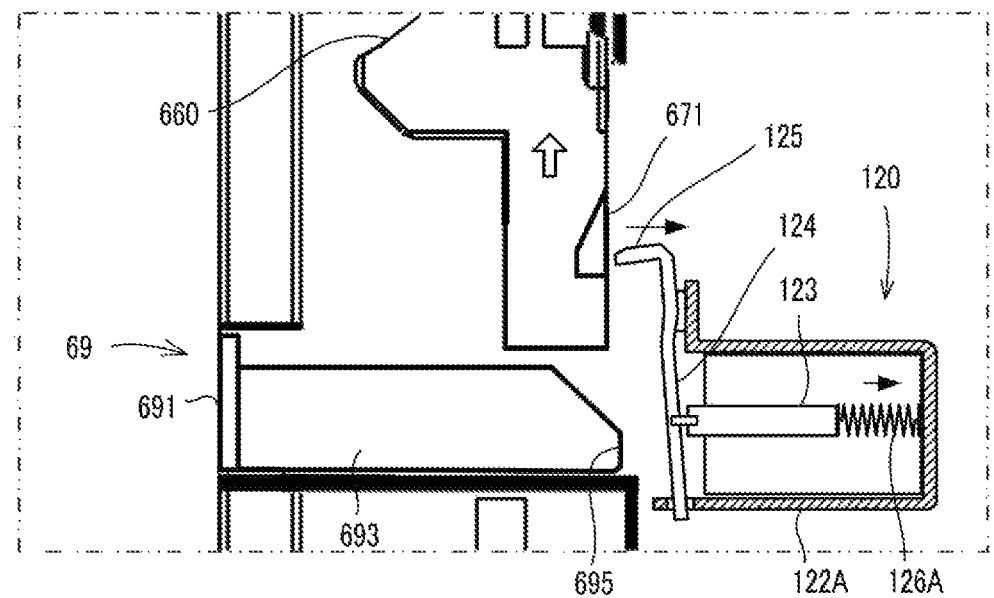
FIG. 16A and FIG. 16B are partially enlarged diagrams showing modification examples of the actuator portion.
Figure 16B:
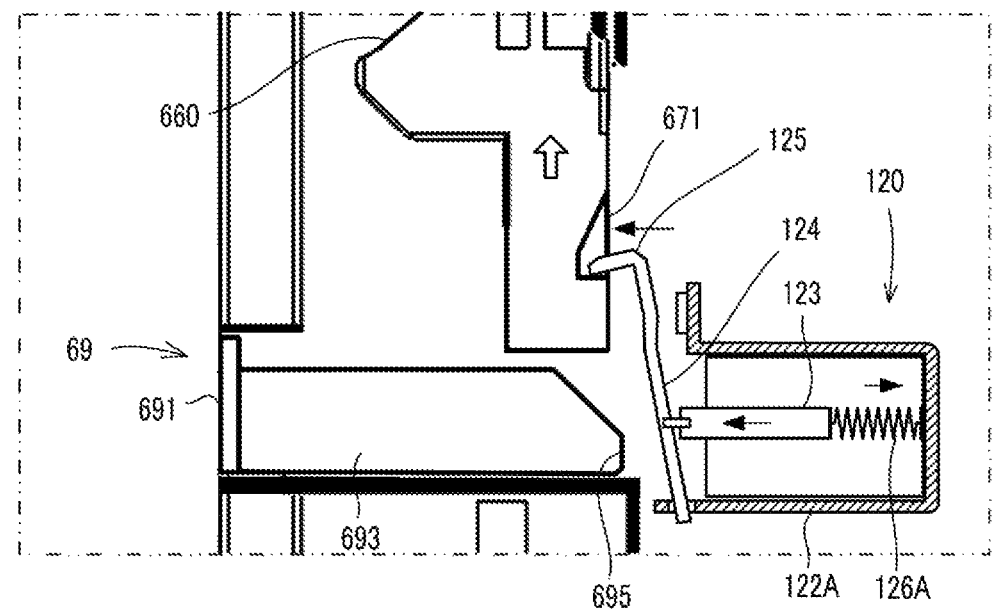

It is noted that, as shown in FIG. 16A and FIG. 16B, the solenoid 122 may be replaced with a solenoid 122A that includes a coil spring 126A configured to bias the plunger 123 inward. In this case, in the non-energized state, the solenoid 122A biases the actuator 124 toward the non-engaging position by the spring force of the coil spring 126A (see FIG. 16A). On the other hand, when the solenoid 122A is energized, the solenoid 122A pushes out the plunger 123 toward the actuator 124 against the spring force of the coil spring 126A in the pulling direction. This allows the actuator 124 to be displaced from the non-engaging position to the engaging position (see FIG. 16B).

In the following, a description is given of an example of the procedure of the unlocking process executed by the control portion 26, with reference to the flowcharts shown in FIG. 17 to FIG. 21. The signs S11, S12, . . . in the drawing represent numbers assigned to the processing procedures (steps). In the following, it is assumed that toner containers 3 have been removed from the image forming apparatus 10 for replacement. In the following description, a step that has been explained once is not explained in detail again, with only the step number indicated.

Figure 17:
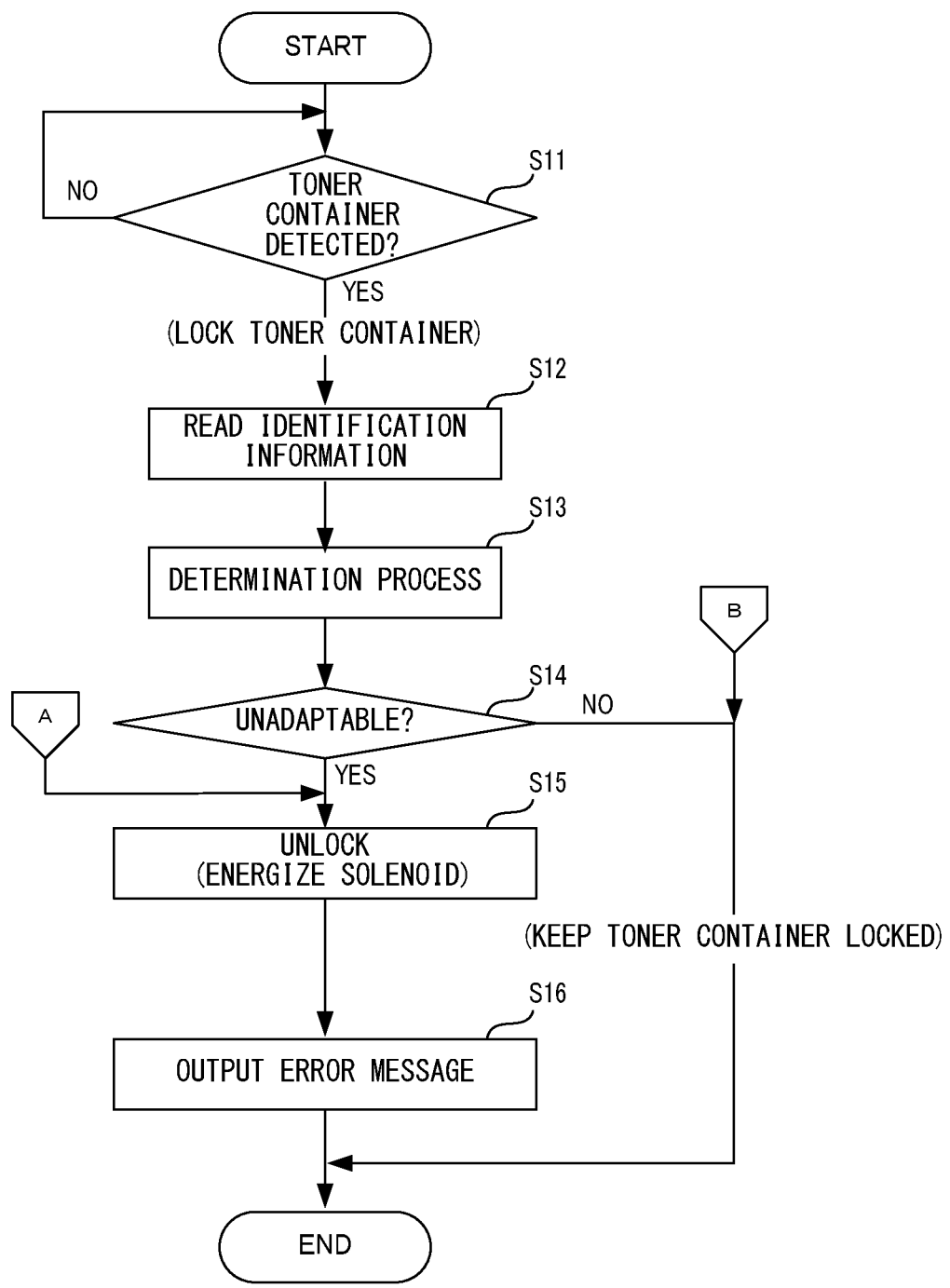
FIG. 17 is a flowchart showing a first example of an unlocking process executed by a control portion.

In the following, a first example (first processing example) of the unlocking process is described with reference to FIG. 17.

First, in step S11, it is detected whether or not a toner container 3 has been inserted in the attachment portion 58 and located at the attachment position. When the toner container 3 reaches the attachment position, the reader 130 performs a communication with the IC memory 57. Upon establishment of the communication, the control portion 26 detects that the toner container 3 is located at the attachment position in the attachment portion 58. It is noted that a limit switch or an optical sensor may be provided in the attachment portion 58 so as to detect whether or not a toner container 3 is located at the attachment position.

As the toner container 3 is inserted and located at the attachment position, the moving frame 65 moves from the unlock position (see FIG. 12) to the lock position (see FIG. 13). As the moving frame 65 moves to the lock position, the hook 125 of the actuator 124 slides on the rear surface of the moving frame 65. When the moving frame 65 reaches the lock position, the hook 125 of the actuator 124 is inserted in the engaging groove 671, and the moving frame 65 is restricted to the lock position (see FIG. 13). That is, the moving frame 65 is locked to the lock position. This allows the toner container 3 to be locked to the attachment position. That is, the toner container 3 is attached to the attachment portion 58.

In the subsequent step S12, the control portion 26 reads the identification information from the IC memory 57. Specifically, the control portion 26 receives the identification information from the reader 130.

In the subsequent step S13, the control portion 26 determines whether or not the toner container 3 attached to the attachment position has an attachment compatibility with the attachment portion 58. Specifically, the control portion 26 compares the read identification information with identification information registered in the internal memory of the control portion 26 to determine whether or not the two pieces of identification information match each other. Upon determining that the two pieces of identification information match each other in step S14, the control portion 26 determines that the toner container 3 has an attachment compatibility and that the toner container 3 is adaptable. On the other hand, upon determining that the two pieces of identification information do not match in step S14, the control portion 26 determines that the toner container 3 does not have the attachment compatibility and that the toner container 3 is unadaptable.

When it is determined in step S14 that the toner container 3 is adaptable, the toner container 3 is kept to be locked, and the series of processes end.

On the other hand, when it is determined in step S14 that the toner container 3 is unadaptable, the toner container 3 is unlocked. That is, the control portion 26 energizes the solenoid 122 to operate the plunger 123, and as shown in FIG. 15, displaces the actuator 124 from the engaging position to the non-engaging position (S15). This allows the moving frame 65 to move from the lock position to the unlock position by receiving the spring force (tensile force) of the coil spring 68. In conjunction with this movement, the toner container 3 moves from the attachment position to the detachment position. Thereafter, the control portion 26 displays an error message that the toner container 3 is unadaptable, on a display panel (not shown) of the image forming apparatus 10.

Figure 18:
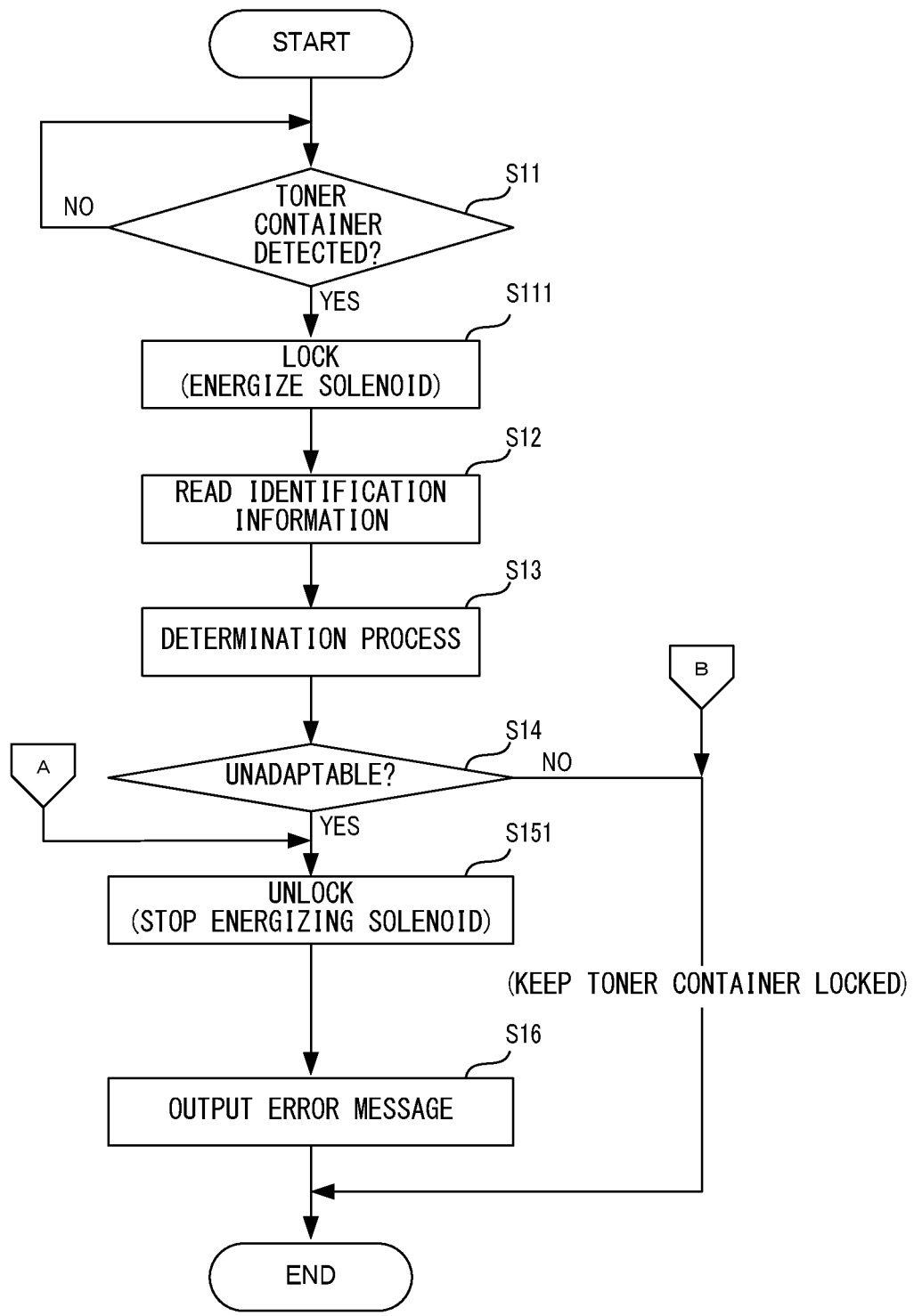
FIG. 18 is a flowchart showing a second example of the unlocking process executed by the control portion.

Next, with reference to FIG. 18, a second example (second processing example) of the unlocking process is described. In this process, the solenoid 122A is used in place of the solenoid 122.

When it is detected that a toner container 3 is located at the attachment position (S11), the control portion 26 locks the toner container 3 (S111). Specifically, the control portion 26 energizes the solenoid 122A to cause the plunger 123 to operate, and displaces the actuator 124 from the non-engaging position to the engaging position (see FIG. 16B).

Subsequently, the above-described processes of step S12 and onward are performed. When it is determined in step S14 that the toner container 3 is adaptable, the toner container 3 is kept to be locked, and the series of processes end.

On the other hand, when it is determined in step S14 that the toner container 3 is unadaptable, the toner container 3 is unlocked. That is, in the next step S151, the control portion 26 stops energizing the solenoid 122A, causes the plunger 123 to operate, and displaces the actuator 124 from the engaging position to the non-engaging position (see FIG. 16A). This allows the moving frame 65 to move from the lock position to the unlock position. In conjunction with this movement, the toner container 3 moves from the attachment position to the detachment position. Thereafter, the control portion 26 outputs the error message (S16).

Figure 19:
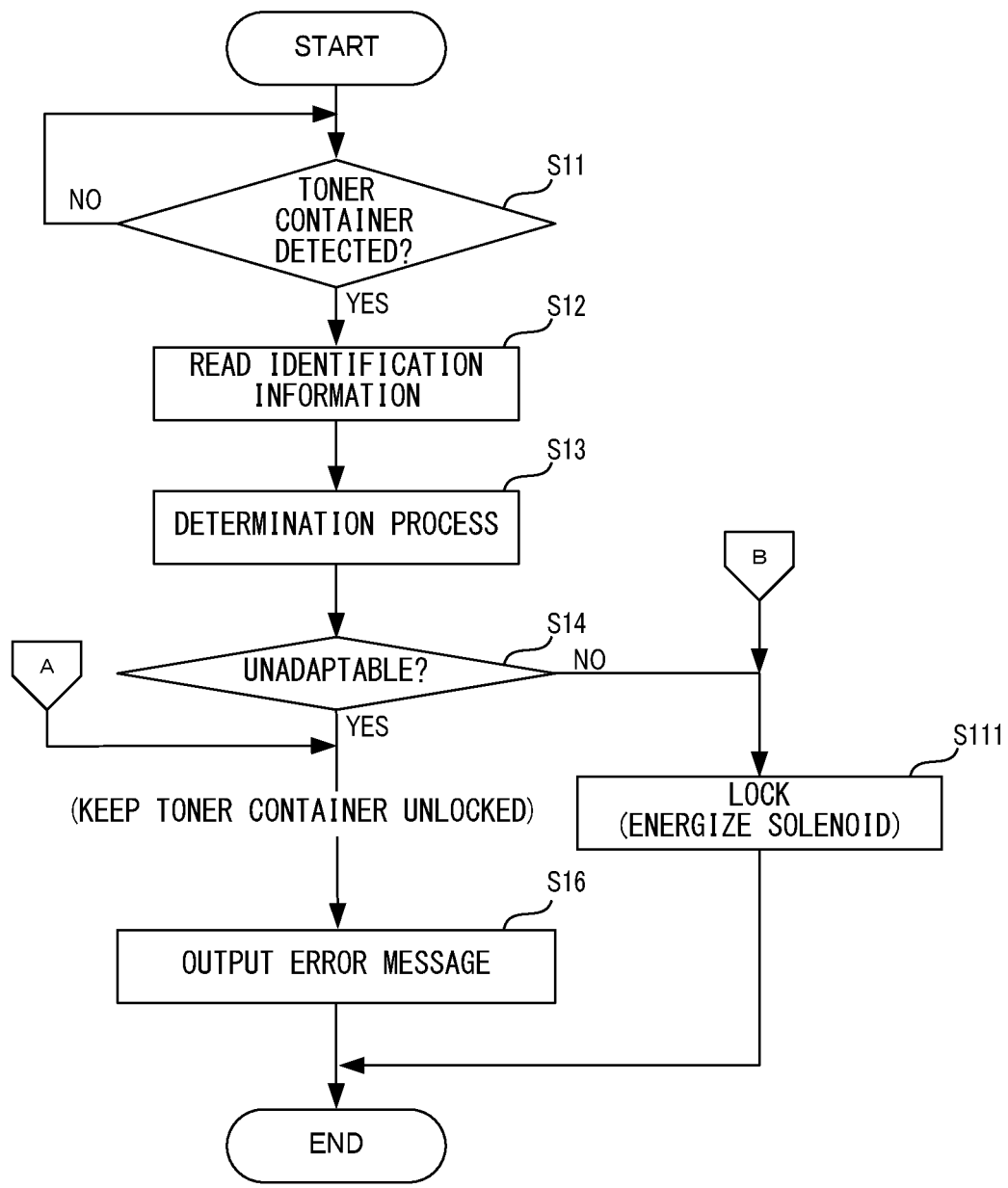
FIG. 19 is a flowchart showing a third example of the unlocking process executed by the control portion.

Next, with reference to FIG. 19, a third example (third processing example) of the unlocking process is described. In this process, the solenoid 122A is used in place of the solenoid 122.

When it is detected that a toner container 3 is located at the attachment position (S11), the control portion 26 executes the processes of step S12 to step S14 while keeping a state where the solenoid 122A is not energized, and the toner container 3 is unlocked (the state shown in FIG. 16A).

When it is determined in step S14 that the toner container 3 is adaptable, the control portion 26 energizes the solenoid 122A to lock the toner container 3 (see FIG. 16B).

On the other hand, when it is determined in step S14 that the toner container 3 is unadaptable, the control portion 26 keeps the state where the toner container 3 is not locked, and outputs the error message (S16).

Figure 20:
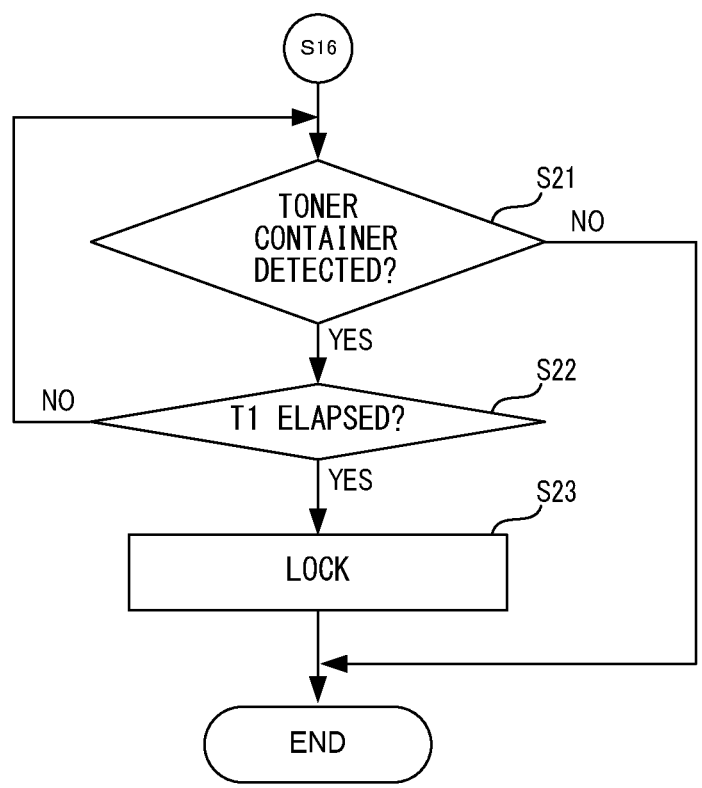
FIG. 20 is a flowchart showing a fourth example of the unlocking process executed by the control portion.

Next, with reference to FIG. 20, a fourth example (fourth processing example) of the unlocking process is described. This process is executed after step S16 of the first to third examples described above.

When the error message is output in step S16, the process moves to step S21 in which the control portion 26 determines whether or not the toner container 3 is located at the attachment position again. Here, if the toner container 3 is located at the attachment position while in the state of being unlocked, it means that the toner container 3 has always been pressed against the attachment portion 58. In this case, the control portion 26 determines that the toner container 3 is continuously located at the attachment position.

In the subsequent step S22, the control portion 26 determines whether or not the time period during which the toner container 3 is continuously located at the attachment position, has exceeded a predetermined set time period T1. Here, upon determining that the time period during which the toner container 3 is continuously located at the attachment position is shorter than the set time period T1, the control portion 26 returns the process to step S21 and executes the process of step S21 and onward. On the other hand, upon determining that the time period during which the toner container 3 is continuously located at the attachment position is equal to or longer than the set time period T1, the control portion 26 executes the process of locking the toner container 3 determined as unadaptable to the attachment position in accordance with the processes of the first to third examples (S23). For example, in accordance with the first example, the control portion 26 stops energizing the solenoid 122. In addition, in accordance with the second example, the control portion 26 keeps energizing the solenoid 122. Furthermore, in accordance with the third example, the control portion 26 energizes the solenoid 122.

Figure 21:
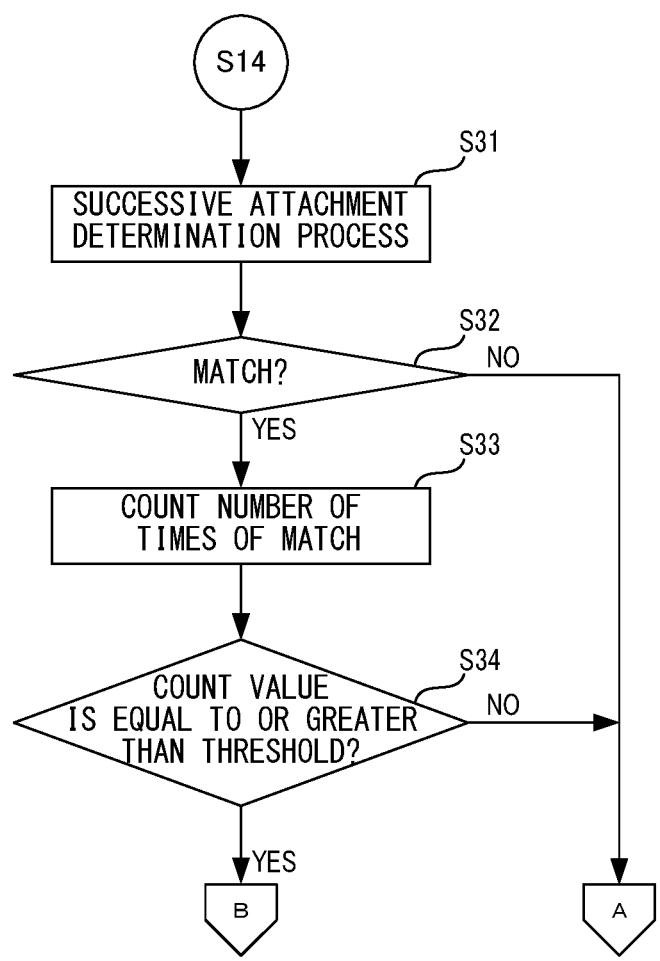
FIG. 21 is a flowchart showing a fifth example of the unlocking process executed by the control portion.

Next, with reference to FIG. 21, a fifth example (fifth processing example) of the unlocking process is described. This process is executed after it is determined, in step S14 of the first to third examples described above, that the toner container 3 is unadaptable.

In this unlocking process, the control portion 26 counts the number of times that the toner container 3 was determined as unadaptable with respect to toner containers 3 that have the same identification information, and when the counted number of times exceeds a predetermined threshold (a set number of times), locks the toner container 3.

Specifically, upon determining in step S14 that the toner container 3 is unadaptable, in the next step S31, the control portion 26 determines whether or not the toner container 3 is the toner container 3 that was determined as unadaptable immediately before. This determination process is executed to determine whether or not a same toner container 3 has been attached to the attachment portion 58 in succession. The control portion 26 stores, in an internal memory of the control portion 26, identification information of a toner container 3 that was determined as unadaptable in the immediately preceding attachment operation, and determines whether or not the stored identification information matches identification information of the toner container 3.

When it is determined in step S32 that the two pieces of identification information match each other, the control portion 26 counts the number of times that they were determined as matching each other, and stores the count value in the internal memory of the control portion 26 (S33). Thereafter, when the count value is equal to or greater than the threshold, the control portion 26 executes the process that is executed when it is determines as NO in step S14 (the process executed when the toner container 3 is determined as adaptable). On the other hand, when the count value is smaller than the threshold, the control portion 26 executes the process that is executed when it is determines as YES in step S14 (the process executed when the toner container 3 is determined as unadaptable).

As described above, according to the present embodiment, since each of the toner containers 3 includes the exterior panel 77, the toner containers 3 can be replaced only if there is a space that allows the toner containers 3 to be removed from the attachment portions 58. In addition, with the above-described configuration of the attachment portions 58, the toner containers 3 can be attached to and detached from the attachment portions 58 only if each of the attachment portions 58 has a space whose length in the depth direction D13 is equal to or larger than the thickness of the toner container 3 in the depth direction D13. With this configuration, the space required for replacement of the toner containers 3 in the present embodiment is smaller than that in conventional apparatuses. This enhances the flexibility of installing the image forming apparatus 10.

Meanwhile, according to a conventional compatibility structure, the compatible keys should be formed on both the toner container and the container attachment portion. In particular, in a case where the incompatibility structure needs to be realized for each of a plurality of regions, or in a case where a plurality of toner containers for a plurality of colors are attached to the image forming apparatus, a plurality of types of compatible keys need to be formed on both the toner container(s) and the container attachment portion(s). On the other hand, it is possible to acquire identification information stored in the memory, and determine whether or not the stored toner is appropriate based on the acquired identification information. However, a toner container is allowed to be attached even if it is inappropriate. As a result, there is a possibility that an inappropriate toner may be supplied to the developing device from the attached toner container.

On the other hand, according to the present embodiment, when the control portion 26 determines that the toner container 3 is unadaptable, the toner container 3 is unlocked from the attachment position in the attachment portion 58, or the toner container 3 is not locked to the attachment position. This makes it possible to detach an unadaptable toner container 3 not having the attachment compatibility from the attachment portion 58, without compatible keys provided in both the attachment portion 58 and the toner container 3.

In addition, when the moving frame 65 is moved from the lock position to the unlock position, and the toner container 3 is unlocked from the attachment position, the toner container 3 projects outward from the right side surface 11A of the housing 11. This enables the user to visually recognize that the toner container 3 that has projected outward is the target of replacement.

In addition, it is possible to displace the actuator 124 from the engaging position to the non-engaging position by a manual operation of pressing the operation member 69. This unlocks the toner container 3, and causes the toner container 3 to be pushed out from the attachment position to the detachment position. With this configuration, the user can remove the toner container 3 easily. Furthermore, since the toner container 3 is pushed out to the detachment position, the user can remove the toner container 3 more easily.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   a toner container configured to be attached to an attachment position set in an apparatus main body;
   a storage portion provided in the toner container and storing identification information of the toner container;
   a support member configured to support the toner container so that the toner container can be moved between the attachment position and a detachment position that is separated from the attachment position toward a predetermined first surface of the apparatus main body;
   a lock member provided on the support member in such a way as to be movable in a first direction that extends along the first surface, the lock member configured to be displaced between a lock position and an unlock position, wherein when the lock member is located at the lock position, the lock member is engaged with the toner container so that the toner container is locked to the attachment position, and when the lock member is located at the unlock position, the toner container is unlocked from the attachment position;
   a moving mechanism configured to move the toner container from the attachment position to the detachment position in conjunction with a displacement of the lock member from the lock position to the unlock position; and
   a lock drive portion configured to acquire the identification information from the storage portion, and upon determining, based on the identification information, that the toner container has an attachment compatibility, place the lock member at the lock position, and upon determining that the toner container does not have the attachment compatibility, place the lock member at the unlock position.

2. The image forming apparatus according to claim 1, wherein the moving mechanism includes:
    a pressing portion that presses the toner container from the attachment position to the detachment position in response to a movement of the lock member from the lock position to the unlock position, and presses the lock member from the unlock position to the lock position in response to a movement of the toner container from the detachment position to the attachment position.

3. The image forming apparatus according to claim 2, further comprising:
    an elastic member configured to bias the lock member from the lock position toward the unlock position.

4. The image forming apparatus according to claim 3, wherein
    the pressing portion is a cam portion provided in the lock member, and
    the cam portion converts a biasing force of the elastic member into a force that moves the toner container from the attachment position toward the detachment position, and converts a pressing force received from the toner container during an attachment of the toner container, into a force that moves the lock member from the unlock position to the lock position against the biasing force of the elastic member.

5. The image forming apparatus according to claim 1, wherein
    the lock drive portion includes:
        an engaging member configured to be displaced between an engaging position and a non-engaging position, wherein at the engaging position, the engaging member is engaged with the lock member and holds the lock member at the lock position, and when the engaging member is located at the non-engaging position, an engagement between the engaging member and the lock member is removed;
        a drive portion configured to cause the engaging member to operate; and
        a control portion configured to acquire the identification information from the storage portion, and drive and control the drive portion based on the identification information so as to displace the engaging member to the engaging position or to the non-engaging position so that the lock member is located at the unlock position.

6. The image forming apparatus according to claim 5, further comprising:
    an operation member provided in the support member and configured to, upon being pressed into the apparatus main body, move the engaging member from the engaging position to the non-engaging position.

7. The image forming apparatus according to claim 5, wherein
    the drive portion is an electric motor that biases the engaging member toward the engaging position, and upon being driven and controlled by the control portion, displaces the engaging member to the non-engaging position, and
    when the control portion determines, based on the identification information, that the toner container does not have the attachment compatibility, the control portion drives the drive portion.

8. The image forming apparatus according to claim 5, wherein
    the control portion counts the number of times that the toner container was determined as not having the attachment compatibility with respect to toner containers that have the same identification information, and when the counted number of times exceeds a predetermined set number of times, the control portion drives the drive portion.

9. The image forming apparatus according to claim 5, wherein
    the control portion determines whether or not a time period during which the toner container is continuously located at the attachment position, has exceeded a predetermined set time period, and upon determining that the time period has exceeded the set time period, the control portion drives the drive portion.

10. The image forming apparatus according to claim 1, wherein
    the toner container includes:
        an engaging piece with which the lock member is engaged in a second direction perpendicular to the first surface when the toner container is located at the attachment position, and
    the lock member includes:
        a hook portion that is engaged with the engaging piece.

11. The image forming apparatus according to claim 1, wherein
    the toner container includes:
        an exterior member that constitutes a part of exterior of the first surface when the toner container is located at the attachment position.

* * * * *